US012499241B2

(12) United States Patent
Sen

(10) Patent No.: US 12,499,241 B2
(45) Date of Patent: Dec. 16, 2025

(54) CORRECTING SECURITY VULNERABILITIES WITH GENERATIVE ARTIFICIAL INTELLIGENCE

(71) Applicant: The Toronto-Dominion Bank, Toronto (CA)

(72) Inventor: Gopendu Sen, Milton (CA)

(73) Assignee: The Toronto-Dominion Bank, Toronto (CA)

( * ) Notice: Subject to any disclaimer, the term of this patent is extended or adjusted under 35 U.S.C. 154(b) by 115 days.

(21) Appl. No.: 18/462,369

(22) Filed: Sep. 6, 2023

(65) Prior Publication Data

US 2025/0077681 A1 Mar. 6, 2025

(51) Int. Cl.
| | |
|---|---|
| *G06F 21/00* | (2013.01) |
| *G06F 8/61* | (2018.01) |
| *G06F 21/53* | (2013.01) |
| *G06F 21/57* | (2013.01) |
| *G06N 3/0455* | (2023.01) |
| *G06N 3/0475* | (2023.01) |

(52) U.S. Cl.
CPC ............ *G06F 21/577* (2013.01); *G06F 8/61* (2013.01); *G06F 21/53* (2013.01); *G06N 3/0455* (2023.01); *G06N 3/0475* (2023.01); *G06F 2221/033* (2013.01)

(58) Field of Classification Search
CPC .......... G06F 21/577; G06F 8/61; G06F 21/53; G06F 2221/033; G06N 3/0455; G06N 3/0475; G06N 20/00
See application file for complete search history.

(56) References Cited

U.S. PATENT DOCUMENTS

| | | |
|---|---|---|
| 7,260,844 B1 | 8/2007 | Tidwell et al. |
| 7,913,230 B2 | 3/2011 | Vikutan |
| 8,650,637 B2 | 2/2014 | Beresnevichiene et al. |
| 8,799,869 B2 | 8/2014 | Grechanik |
| 8,839,440 B2 | 9/2014 | Yun et al. |
| 9,135,150 B2 | 9/2015 | Rumble |
| 9,152,795 B2 | 10/2015 | LaverdiÈRe-Papineau |
| 9,160,762 B2 | 10/2015 | Brake et al. |
| 9,183,124 B2 | 11/2015 | Brown et al. |
| 9,417,994 B2 | 8/2016 | Ellis et al. |
| 9,606,900 B1 | 3/2017 | Pradhan et al. |
| 9,864,982 B2 | 1/2018 | Bristow et al. |
| 9,886,375 B2 | 2/2018 | Rumble |

(Continued)

OTHER PUBLICATIONS

Heglin et al., "Auto-Adjudication Process VIA Machine Learning," U.S. Appl. No. 19/053,942, filed Feb. 14, 2025.

(Continued)

*Primary Examiner* — Ghazal B Shehni

(57) ABSTRACT

An example operation may include one or more of monitoring communications that occur with user devices over a shared computer network, detecting a security threat from the monitored communications, generating a software program to simulate the security threat over the shared computer network based on execution of a generative artificial intelligence (GenAI) model on a description of the security threat and a repository of source code, installing the source code for simulating the security threat on a system associated with the computer network, and executing the source code for simulating the security threat via the system.

18 Claims, 29 Drawing Sheets

(56) References Cited

U.S. PATENT DOCUMENTS

| | | |
|---|---|---|
| 9,996,451 B2 | 6/2018 | Andrejko et al. |
| 10,019,345 B2 | 7/2018 | Alteneder et al. |
| 10,152,405 B2 | 12/2018 | Verma |
| 10,157,122 B1 | 12/2018 | Gohil et al. |
| 10,163,085 B2 | 12/2018 | D'Agostino et al. |
| 10,178,246 B1 | 1/2019 | Horvath et al. |
| 10,181,114 B2 | 1/2019 | Tseretopoulos et al. |
| 10,257,227 B1 | 4/2019 | Stickle et al. |
| 10,339,931 B2 | 7/2019 | Tseretopoulos et al. |
| 10,346,824 B2 | 7/2019 | Chan et al. |
| 10,360,303 B2 | 7/2019 | Volkovs et al. |
| 10,405,146 B1 | 9/2019 | Kuruvilla et al. |
| 10,438,206 B2 | 10/2019 | Jivraj et al. |
| 10,440,196 B2 | 10/2019 | Horvath et al. |
| 10,440,197 B2 | 10/2019 | Horvath et al. |
| 10,460,748 B2 | 10/2019 | Tseretopoulos et al. |
| 10,482,675 B1 | 11/2019 | Sutter et al. |
| 10,509,718 B2 | 12/2019 | Venkatasubramanian et al. |
| 10,515,002 B2 | 12/2019 | Takawale et al. |
| 10,607,013 B2 | 3/2020 | Steele et al. |
| 10,613,966 B2 | 4/2020 | Nagpal et al. |
| 10,621,360 B2 | 4/2020 | Holz et al. |
| 10,642,721 B2 | 5/2020 | Kulkarni et al. |
| 10,659,400 B2 | 5/2020 | Moon et al. |
| 10,698,902 B2 | 6/2020 | Tseretopoulos et al. |
| 10,706,635 B2 | 7/2020 | Sutter et al. |
| 10,708,721 B2 | 7/2020 | Kuruvilla et al. |
| 10,728,259 B2 | 7/2020 | McCarter et al. |
| 10,776,619 B2 | 9/2020 | Collinson et al. |
| 10,824,941 B2 | 11/2020 | Volkovs et al. |
| 10,831,923 B2 | 11/2020 | Dunjic et al. |
| 10,832,047 B2 | 11/2020 | Moghtadai |
| 10,838,848 B2 | 11/2020 | Fong |
| 10,862,897 B2 | 12/2020 | D'Agostino et al. |
| 10,867,292 B2 | 12/2020 | Lin et al. |
| 10,867,293 B2 | 12/2020 | Bristow et al. |
| 10,878,816 B2 | 12/2020 | Tseretopoulos et al. |
| 10,902,220 B2 | 1/2021 | Lozon et al. |
| 10,922,665 B2 | 2/2021 | Miller et al. |
| 10,943,605 B2 | 3/2021 | Tseretopoulos et al. |
| 10,949,337 B1 | 3/2021 | Yalla et al. |
| 10,977,164 B2 | 4/2021 | Saha et al. |
| 10,977,617 B2 | 4/2021 | Tseretopoulos et al. |
| 10,989,757 B2 | 4/2021 | Venkataraman et al. |
| 11,004,187 B2 | 5/2021 | Kuruvilla et al. |
| 11,017,028 B2 | 5/2021 | Dunjic et al. |
| 11,030,415 B2 | 6/2021 | Volkovs et al. |
| 11,055,924 B2 | 7/2021 | Navarro et al. |
| 11,061,638 B2 | 7/2021 | Lam |
| 11,070,448 B2 | 7/2021 | Miller et al. |
| 11,087,314 B2 | 8/2021 | Gandhi et al. |
| 11,100,168 B2 | 8/2021 | Miller et al. |
| 11,140,143 B2 | 10/2021 | Moon et al. |
| 11,144,921 B2 | 10/2021 | Dunjic et al. |
| 11,144,998 B2 | 10/2021 | Kuruvilla et al. |
| 11,145,169 B2 | 10/2021 | Pratten et al. |
| 11,182,860 B2 | 11/2021 | Kuruvilla et al. |
| 11,200,328 B2 | 12/2021 | Shpurov et al. |
| 11,200,411 B2 | 12/2021 | Rizvi et al. |
| 11,210,857 B2 | 12/2021 | Rizvi et al. |
| 11,222,286 B2 | 1/2022 | Choe et al. |
| 11,232,304 B2 | 1/2022 | Navarro et al. |
| 11,263,327 B2 | 3/2022 | Steele et al. |
| 11,276,257 B2 | 3/2022 | Moghtadai et al. |
| 11,303,642 B2 | 4/2022 | Dunjic et al. |
| 11,334,574 B2 | 5/2022 | Caputo et al. |
| 11,347,744 B2 | 5/2022 | Tseretopoulos et al. |
| 11,349,871 B2 | 5/2022 | Moon et al. |
| 11,354,442 B2 | 6/2022 | Haldenby et al. |
| 11,361,566 B2 | 6/2022 | Collinson et al. |
| 11,373,229 B2 | 6/2022 | Tseretopoulos et al. |
| 11,392,776 B2 | 7/2022 | Lozon et al. |
| 11,393,020 B2 | 7/2022 | Mathew et al. |
| 11,394,668 B1 | 7/2022 | Subbunarayanan et al. |
| 11,397,765 B2 | 7/2022 | Volkovs et al. |
| 11,409,811 B2 | 8/2022 | D'Agostino |
| 11,411,734 B2 | 8/2022 | Shpurov et al. |
| 11,423,157 B2 | 8/2022 | Lewis et al. |
| 11,430,242 B2 | 8/2022 | Moghtadai |
| 11,436,809 B2 | 9/2022 | Rizvi et al. |
| 11,451,669 B1 | 9/2022 | Navarro et al. |
| 11,469,878 B2 | 10/2022 | Shpurov et al. |
| 11,470,091 B2 | 10/2022 | McCarter et al. |
| 11,470,143 B2 | 10/2022 | Joheb et al. |
| 11,475,059 B2 | 10/2022 | Liu et al. |
| 11,475,251 B2 | 10/2022 | Morin et al. |
| 11,477,265 B2 | 10/2022 | McPhee et al. |
| 11,500,997 B1 | 11/2022 | Bongiorni et al. |
| 11,507,622 B2 | 11/2022 | Grebenisan et al. |
| 11,507,868 B2 | 11/2022 | Kwong et al. |
| 11,521,134 B2 | 12/2022 | Bhole et al. |
| 11,526,334 B2 | 12/2022 | Kozhisseri et al. |
| 11,546,345 B2 | 1/2023 | D'Agostino et al. |
| 11,568,055 B2 | 1/2023 | Olson et al. |
| 11,580,762 B2 | 2/2023 | Rizvi et al. |
| 11,599,454 B2 | 3/2023 | Venugopal et al. |
| 11,599,455 B2 | 3/2023 | Venugopal et al. |
| 11,600,064 B2 | 3/2023 | Navarro et al. |
| 11,604,899 B2 | 3/2023 | Haldenby et al. |
| 11,620,741 B2 | 4/2023 | Kuruvilla et al. |
| 11,632,311 B2 | 4/2023 | Miller et al. |
| 11,650,905 B2 | 5/2023 | Sharma |
| 11,651,100 B2 | 5/2023 | Barday et al. |
| 11,656,977 B2 | 5/2023 | Yosef et al. |
| 11,663,488 B2 | 5/2023 | Volkovs et al. |
| 11,671,536 B2 | 6/2023 | Navarro et al. |
| 11,675,692 B2 | 6/2023 | Balasubramanian et al. |
| 11,681,607 B2 | 6/2023 | Subbunarayanan et al. |
| 11,687,995 B2 | 6/2023 | Tseretopoulos et al. |
| 11,689,484 B2 | 6/2023 | Moon et al. |
| 11,694,124 B2 | 7/2023 | Ramalingam et al. |
| 11,704,782 B2 | 7/2023 | Wakim et al. |
| 11,709,765 B1 | 7/2023 | Raja et al. |
| 11,741,305 B2 | 8/2023 | Skaljin et al. |
| 11,743,210 B2 | 8/2023 | Moon et al. |
| 11,748,400 B2 | 9/2023 | Volkovs et al. |
| 11,756,388 B2 | 9/2023 | Pratten et al. |
| 11,777,918 B2 | 10/2023 | Moon et al. |
| 11,782,935 B2 | 10/2023 | Caputo et al. |
| 11,789,909 B2 | 10/2023 | Grebenisan et al. |
| 11,790,012 B2 | 10/2023 | D'Agostino |
| 11,790,354 B2 | 10/2023 | Gandhi et al. |
| 11,797,962 B2 | 10/2023 | Jones et al. |
| 11,809,486 B2 | 11/2023 | Liu et al. |
| 11,809,577 B2 | 11/2023 | Begg et al. |
| 11,811,826 B2 | 11/2023 | Moon et al. |
| 11,842,252 B2 | 12/2023 | Kuang et al. |
| 11,875,398 B2 | 1/2024 | Pratten et al. |
| 11,880,811 B2 | 1/2024 | Pawelkiewicz et al. |
| 11,886,764 B2 | 1/2024 | Lam |
| 11,928,112 B2 | 3/2024 | Dunjic et al. |
| 11,941,525 B2 | 3/2024 | Morin et al. |
| 11,941,703 B2 | 3/2024 | Kuruvilla et al. |
| 11,955,117 B2 | 4/2024 | Mcdermid et al. |
| 11,966,491 B2 | 4/2024 | D'Agostino |
| 11,978,085 B2 | 5/2024 | Rai et al. |
| 11,978,090 B2 | 5/2024 | Navarro et al. |
| 11,985,153 B2 | 5/2024 | Karl |
| 11,995,121 B2 | 5/2024 | Volkovs et al. |
| 12,008,315 B2 | 6/2024 | Miller et al. |
| 12,014,303 B2 | 6/2024 | Carvalho et al. |
| 12,019,594 B2 | 6/2024 | Floyd et al. |
| 12,021,874 B2 | 6/2024 | Dunjic et al. |
| 12,039,535 B2 | 7/2024 | Dunjic et al. |
| 12,052,363 B2 | 7/2024 | Shpurov et al. |
| 12,061,652 B2 | 8/2024 | Miller et al. |
| 12,067,130 B2 | 8/2024 | Shpurov et al. |
| 12,067,580 B2 | 8/2024 | Jeske et al. |
| 12,079,351 B2 | 9/2024 | Begg et al. |
| 12,106,220 B2 | 10/2024 | Volkovs et al. |
| 12,111,793 B2 | 10/2024 | Grebenisan et al. |
| 12,124,925 B2 | 10/2024 | Rho et al. |
| 12,136,079 B2 | 11/2024 | Jones et al. |
| 12,164,542 B1 | 12/2024 | Rahman et al. |

(56) References Cited

U.S. PATENT DOCUMENTS

| | | |
|---|---|---|
| 12,169,693 B2 | 12/2024 | Lu |
| 12,182,269 B2 | 12/2024 | Babic et al. |
| 12,182,800 B2 | 12/2024 | Navarro et al. |
| 12,198,109 B2 | 1/2025 | Abbas |
| 12,198,510 B2 | 1/2025 | Pratten et al. |
| 12,210,534 B2 | 1/2025 | Cashion et al. |
| 12,211,274 B2 | 1/2025 | Ma et al. |
| 12,217,011 B2 | 2/2025 | Luo et al. |
| 12,223,549 B2 | 2/2025 | Bouëtté et al. |
| 12,229,690 B2 | 2/2025 | Stanevich et al. |
| 12,254,512 B2 | 3/2025 | Heglin et al. |
| 12,282,785 B2 | 4/2025 | Karbasi et al. |
| 12,288,236 B2 | 4/2025 | Volkovs et al. |
| 12,299,149 B2 | 5/2025 | Nikoghossian et al. |
| 12,316,715 B2 | 5/2025 | Taheri et al. |
| 12,321,861 B2 | 6/2025 | Volkovs et al. |
| 12,326,856 B2 | 6/2025 | Mohammed et al. |
| 12,333,354 B2 | 6/2025 | Mohammed et al. |
| 12,353,969 B2 | 7/2025 | Kuang et al. |
| 12,354,094 B2 | 7/2025 | Jones et al. |
| 12,373,795 B2 | 7/2025 | Misler et al. |
| 2009/0094575 A1 | 4/2009 | Vieira et al. |
| 2015/0082287 A1 | 3/2015 | Augustine et al. |
| 2015/0100830 A1 | 4/2015 | Nanjundappa et al. |
| 2018/0024912 A1 | 1/2018 | Verma |
| 2018/0121659 A1* | 5/2018 | Sawhney .............. G06F 21/566 |
| 2018/0268818 A1 | 9/2018 | Schoenmackers et al. |
| 2019/0172045 A1 | 6/2019 | Dunjic et al. |
| 2019/0196949 A1 | 6/2019 | Venkataraman et al. |
| 2019/0213115 A1 | 7/2019 | Takawale et al. |
| 2019/0213116 A1 | 7/2019 | Kulkarni et al. |
| 2020/0019488 A1 | 1/2020 | Singh et al. |
| 2020/0058068 A1 | 2/2020 | Gandhi et al. |
| 2021/0027160 A1 | 1/2021 | Volkovs et al. |
| 2021/0037040 A1 | 2/2021 | Aleks et al. |
| 2021/0042217 A1 | 2/2021 | Hwang et al. |
| 2021/0117893 A1 | 4/2021 | Sohum et al. |
| 2021/0173935 A1 | 6/2021 | Ramasamy et al. |
| 2021/0209304 A1 | 7/2021 | Yang et al. |
| 2021/0232950 A1 | 7/2021 | Kono |
| 2021/0264461 A1 | 8/2021 | Fam |
| 2021/0407016 A1 | 12/2021 | Kuruvilla et al. |
| 2022/0058489 A1 | 2/2022 | Volkovs et al. |
| 2022/0067174 A1 | 3/2022 | Gupta |
| 2022/0108069 A1 | 4/2022 | Lee |
| 2022/0157094 A1 | 5/2022 | Moghtadai et al. |
| 2022/0172083 A1 | 6/2022 | Wu et al. |
| 2022/0179639 A1* | 6/2022 | Manley .............. G06F 11/3688 |
| 2022/0188079 A1 | 6/2022 | Kohisseri et al. |
| 2022/0188705 A1 | 6/2022 | Davoodi et al. |
| 2022/0198411 A1 | 6/2022 | Jones et al. |
| 2022/0198432 A1 | 6/2022 | Jones et al. |
| 2022/0198445 A1 | 6/2022 | Jones et al. |
| 2022/0207295 A1 | 6/2022 | Stanevich et al. |
| 2022/0207430 A1 | 6/2022 | Dickie et al. |
| 2022/0207432 A1 | 6/2022 | Whelan et al. |
| 2022/0207606 A1 | 6/2022 | Dickie et al. |
| 2022/0245060 A1 | 8/2022 | Kathuria et al. |
| 2022/0270155 A1 | 8/2022 | Volkovs et al. |
| 2022/0277213 A1 | 9/2022 | Braviner et al. |
| 2022/0277227 A1 | 9/2022 | Yu et al. |
| 2022/0277323 A1 | 9/2022 | Whelan et al. |
| 2022/0284450 A1 | 9/2022 | Asta et al. |
| 2022/0300903 A1 | 9/2022 | Huang et al. |
| 2022/0309573 A1 | 9/2022 | Mathew et al. |
| 2022/0318573 A1 | 10/2022 | Smith et al. |
| 2022/0318617 A1 | 10/2022 | Wong et al. |
| 2022/0327397 A1 | 10/2022 | Braviner et al. |
| 2022/0327430 A1 | 10/2022 | Zuberi et al. |
| 2022/0327431 A1 | 10/2022 | Braviner et al. |
| 2022/0327432 A1 | 10/2022 | Gutierrez Bugarin et al. |
| 2022/0327625 A1 | 10/2022 | Leung et al. |
| 2022/0335718 A1 | 10/2022 | Ma et al. |
| 2022/0343422 A1 | 10/2022 | Zuberi et al. |
| 2022/0366064 A1 | 11/2022 | Nikoghossian et al. |
| 2022/0383301 A1 | 12/2022 | Jones et al. |
| 2022/0383313 A1 | 12/2022 | Jones et al. |
| 2022/0383314 A1 | 12/2022 | Jones et al. |
| 2022/0391643 A1 | 12/2022 | Mansour et al. |
| 2022/0405061 A1 | 12/2022 | Jariwala |
| 2022/0405299 A1 | 12/2022 | Leung et al. |
| 2022/0414495 A1 | 12/2022 | Stanevich et al. |
| 2023/0006809 A1 | 1/2023 | Shpurov et al. |
| 2023/0007075 A1 | 1/2023 | Mcphee et al. |
| 2023/0011451 A1 | 1/2023 | Lu |
| 2023/0048437 A1 | 2/2023 | Karbasi et al. |
| 2023/0064373 A1* | 3/2023 | Starr .............. G06F 21/577 |
| 2023/0083899 A1 | 3/2023 | Gandouet et al. |
| 2023/0086653 A1 | 3/2023 | Zykh et al. |
| 2023/0099502 A1 | 3/2023 | Fix et al. |
| 2023/0107703 A1 | 4/2023 | Zhang et al. |
| 2023/0113752 A1 | 4/2023 | Jorlett et al. |
| 2023/0119108 A1 | 4/2023 | Volkovs et al. |
| 2023/0131935 A1 | 4/2023 | Volkovs et al. |
| 2023/0153461 A1 | 5/2023 | Kalra et al. |
| 2023/0195734 A1 | 6/2023 | Cashion et al. |
| 2023/0196406 A1 | 6/2023 | Gandouet et al. |
| 2023/0205888 A1 | 6/2023 | Tyagi et al. |
| 2023/0237826 A1 | 7/2023 | Perez et al. |
| 2023/0244917 A1 | 8/2023 | Loaiza Ganem et al. |
| 2023/0244962 A1 | 8/2023 | Volkovs et al. |
| 2023/0251960 A1 | 8/2023 | Sharma et al. |
| 2023/0252301 A1 | 8/2023 | Volkovs et al. |
| 2023/0259883 A1 | 8/2023 | Misler et al. |
| 2023/0267367 A1 | 8/2023 | Volkovs et al. |
| 2023/0267475 A1 | 8/2023 | Navarro et al. |
| 2023/0306434 A1 | 9/2023 | Dunjic et al. |
| 2023/0316485 A1 | 10/2023 | Wakim et al. |
| 2023/0318994 A1 | 10/2023 | Moon et al. |
| 2023/0336581 A1* | 10/2023 | Dunn .............. G06F 21/577 |
| 2023/0336615 A1 | 10/2023 | Joheb et al. |
| 2023/0342481 A1 | 10/2023 | Nikoghossian et al. |
| 2023/0344814 A1 | 10/2023 | Moon et al. |
| 2023/0351116 A1 | 11/2023 | Skaljin et al. |
| 2023/0368048 A1 | 11/2023 | Yang et al. |
| 2023/0377047 A1 | 11/2023 | Bouëtté et al. |
| 2023/0385693 A1 | 11/2023 | Cresswell et al. |
| 2023/0385694 A1 | 11/2023 | Cresswell et al. |
| 2023/0386190 A1 | 11/2023 | Cresswell et al. |
| 2023/0394452 A1 | 12/2023 | Jones et al. |
| 2023/0401192 A1 | 12/2023 | Yang et al. |
| 2023/0401553 A1 | 12/2023 | Navarro et al. |
| 2023/0401572 A1 | 12/2023 | Navarro et al. |
| 2023/0419302 A1 | 12/2023 | Navarro et al. |
| 2023/0419402 A1 | 12/2023 | Ghelichi et al. |
| 2024/0004623 A1 | 1/2024 | Groenewegen et al. |
| 2024/0020534 A1 | 1/2024 | Perez Vallejo et al. |
| 2024/0045971 A1 | 2/2024 | Ben Salem et al. |
| 2024/0062117 A1 | 2/2024 | Kuang et al. |
| 2024/0106851 A1 | 3/2024 | Kennedy et al. |
| 2024/0119140 A1 | 4/2024 | Crabtree et al. |
| 2024/0119346 A1 | 4/2024 | Chang et al. |
| 2024/0126575 A1 | 4/2024 | Kiriakou et al. |
| 2024/0127036 A1 | 4/2024 | Zuberi et al. |
| 2024/0127214 A1 | 4/2024 | Wander et al. |
| 2024/0193562 A1 | 6/2024 | Pratten et al. |
| 2024/0202756 A1 | 6/2024 | Karl et al. |
| 2024/0203405 A1 | 6/2024 | McDermid et al. |
| 2024/0211732 A1 | 6/2024 | Wander et al. |
| 2024/0212049 A1 | 6/2024 | Ghelichi et al. |
| 2024/0220653 A1 | 7/2024 | D'Agostino |
| 2024/0232614 A1 | 7/2024 | Esmaeili et al. |
| 2024/0232950 A1 | 7/2024 | Navarro et al. |
| 2024/0249310 A1 | 7/2024 | Rai et al. |
| 2024/0256423 A1 | 8/2024 | Zhang et al. |
| 2024/0256903 A1 | 8/2024 | Ens et al. |
| 2024/0256904 A1 | 8/2024 | Leung et al. |
| 2024/0256968 A1 | 8/2024 | Hosseinzadeh et al. |
| 2024/0265055 A1 | 8/2024 | Purkayastha |
| 2024/0265281 A1 | 8/2024 | Hart et al. |
| 2024/0281467 A1 | 8/2024 | Volkovs et al. |
| 2024/0281808 A1 | 8/2024 | Vouitsis et al. |
| 2024/0281818 A1 | 8/2024 | Golestan Irani et al. |
| 2024/0289645 A1 | 8/2024 | Makhijani et al. |

(56) References Cited

U.S. PATENT DOCUMENTS

| | | |
|---|---|---|
| 2024/0289876 A1 | 8/2024 | Mathew et al. |
| 2024/0303551 A1 | 9/2024 | Li et al. |
| 2024/0304182 A1 | 9/2024 | Hamilton et al. |
| 2024/0330165 A1 | 10/2024 | Pryzant et al. |
| 2024/0330772 A1 | 10/2024 | Cresswell et al. |
| 2024/0330809 A1 | 10/2024 | Carvalho et al. |
| 2024/0338520 A1 | 10/2024 | Misler et al. |
| 2024/0346338 A1 | 10/2024 | Desai et al. |
| 2024/0370880 A1 | 11/2024 | Jeske et al. |
| 2024/0370881 A1 | 11/2024 | Jeske et al. |
| 2024/0385838 A1 | 11/2024 | Yu et al. |
| 2024/0386295 A1 | 11/2024 | Yu et al. |
| 2024/0386325 A1 | 11/2024 | Yu et al. |
| 2024/0386326 A1 | 11/2024 | Yu et al. |
| 2024/0386427 A1 | 11/2024 | Abbas et al. |
| 2024/0394569 A1 | 11/2024 | Farhadi Hassan Kiadeh et al. |
| 2024/0394588 A1 | 11/2024 | Heglan et al. |
| 2024/0403702 A1 | 12/2024 | Deljavan Farshi |
| 2024/0403862 A1 | 12/2024 | Abbas et al. |
| 2024/0411673 A1 | 12/2024 | Deakin |
| 2024/0412069 A1 | 12/2024 | Volkovs et al. |
| 2024/0412078 A1 | 12/2024 | Ghelichi et al. |
| 2024/0412083 A1 | 12/2024 | Starszyk et al. |
| 2024/0419978 A1 | 12/2024 | Stein et al. |
| 2024/0420010 A1 | 12/2024 | Cirulis et al. |
| 2024/0420011 A1 | 12/2024 | Cirulis et al. |
| 2024/0428283 A1 | 12/2024 | Belbahri et al. |
| 2025/0013363 A1 | 1/2025 | Estoesta et al. |
| 2025/0013697 A1 | 1/2025 | Estoesta et al. |
| 2025/0013927 A1 | 1/2025 | Rho et al. |
| 2025/0014010 A1 | 1/2025 | Jones et al. |
| 2025/0014052 A1 | 1/2025 | Bhattacharjee et al. |
| 2025/0028852 A1 | 1/2025 | Chowanski et al. |
| 2025/0028934 A1 | 1/2025 | Wong et al. |
| 2025/0029012 A1 | 1/2025 | Rho et al. |
| 2025/0036778 A1 | 1/2025 | Chan et al. |
| 2025/0045185 A1 | 2/2025 | Tang et al. |
| 2025/0045601 A1 | 2/2025 | Zuberi et al. |
| 2025/0053387 A1 | 2/2025 | Wang et al. |
| 2025/0068646 A1 | 2/2025 | Rahman et al. |
| 2025/0068853 A1 | 2/2025 | Lu |
| 2025/0069063 A1 | 2/2025 | Navarro et al. |
| 2025/0077187 A1 | 3/2025 | Guttridge et al. |
| 2025/0077188 A1 | 3/2025 | Guttridge et al. |
| 2025/0077189 A1 | 3/2025 | Guttridge et al. |
| 2025/0077190 A1 | 3/2025 | Guttridge et al. |
| 2025/0077204 A1 | 3/2025 | Guttridge et al. |
| 2025/0077227 A1 | 3/2025 | Guttridge et al. |
| 2025/0077396 A1 | 3/2025 | Sen |
| 2025/0077397 A1 | 3/2025 | Sen |
| 2025/0077399 A1 | 3/2025 | Sen |
| 2025/0077400 A1 | 3/2025 | Sen |
| 2025/0077556 A1 | 3/2025 | Guttridge et al. |
| 2025/0077681 A1 | 3/2025 | Sen |
| 2025/0077682 A1 | 3/2025 | Guttridge et al. |
| 2025/0077939 A1 | 3/2025 | Tabatabaei et al. |
| 2025/0078324 A1 | 3/2025 | Gormley |
| 2025/0078325 A1 | 3/2025 | Gormley |
| 2025/0078344 A1 | 3/2025 | Gormley |
| 2025/0078345 A1 | 3/2025 | Gormley |
| 2025/0078972 A1 | 3/2025 | Gormley |
| 2025/0085936 A1 | 3/2025 | Guttridge et al. |
| 2025/0086096 A1 | 3/2025 | Guttridge et al. |
| 2025/0086440 A1 | 3/2025 | Erb et al. |
| 2025/0086441 A1 | 3/2025 | Guttridge et al. |
| 2025/0086451 A1 | 3/2025 | Guttridge et al. |
| 2025/0086551 A1 | 3/2025 | Zhao |
| 2025/0094437 A1 | 3/2025 | Upendran |
| 2025/0103609 A1 | 3/2025 | Upendran |
| 2025/0103961 A1 | 3/2025 | Cresswell et al. |
| 2025/0103980 A1 | 3/2025 | Deljavan Farshi et al. |
| 2025/0104024 A1 | 3/2025 | Abbas |
| 2025/0104029 A1 | 3/2025 | Deljavan Farshi et al. |
| 2025/0104047 A1 | 3/2025 | Mashkevich |
| 2025/0104050 A1 | 3/2025 | Mashkevich |
| 2025/0104059 A1 | 3/2025 | Mashkevich |
| 2025/0104074 A1 | 3/2025 | Tsang et al. |
| 2025/0104306 A1 | 3/2025 | Mashkevich |
| 2025/0104700 A1 | 3/2025 | Henault-Ethier et al. |
| 2025/0106060 A1 | 3/2025 | Gormley et al. |
| 2025/0106201 A1 | 3/2025 | Gormley |
| 2025/0110805 A1 | 4/2025 | Starszyk et al. |
| 2025/0117411 A1 | 4/2025 | Mohammed |
| 2025/0117595 A1 | 4/2025 | Taheri |
| 2025/0117596 A1 | 4/2025 | Taheri |
| 2025/0117623 A1 | 4/2025 | Devarajan et al. |
| 2025/0117629 A1 | 4/2025 | Pandey et al. |
| 2025/0117630 A1 | 4/2025 | Taheri et al. |
| 2025/0117769 A1 | 4/2025 | Taheri et al. |
| 2025/0117836 A1 | 4/2025 | Pandey et al. |
| 2025/0117853 A1 | 4/2025 | Pandey et al. |
| 2025/0117854 A1 | 4/2025 | Pandey et al. |
| 2025/0117855 A1 | 4/2025 | Pandey et al. |
| 2025/0117856 A1 | 4/2025 | Pandey et al. |
| 2025/0119396 A1 | 4/2025 | Taheri |
| 2025/0119494 A1 | 4/2025 | Pandey et al. |
| 2025/0119495 A1 | 4/2025 | Pandey et al. |
| 2025/0124039 A1 | 4/2025 | Cashion et al. |
| 2025/0124240 A1 | 4/2025 | Luo et al. |
| 2025/0131718 A1 | 4/2025 | Ma et al. |
| 2025/0138838 A1 | 5/2025 | Ramesh et al. |
| 2025/0139267 A1 | 5/2025 | Zykh et al. |
| 2025/0139382 A1 | 5/2025 | Mohammed et al. |
| 2025/0139708 A1 | 5/2025 | Bouëtté et al. |
| 2025/0147733 A1 | 5/2025 | Abbas et al. |
| 2025/0148321 A1 | 5/2025 | Stanevich et al. |
| 2025/0165375 A1 | 5/2025 | Cresswell et al. |
| 2025/0165866 A1 | 5/2025 | Cresswell et al. |
| 2025/0173170 A1 | 5/2025 | Glynn-Udrow et al. |
| 2025/0173568 A1 | 5/2025 | Cresswell et al. |
| 2025/0173618 A1 | 5/2025 | Cresswell et al. |
| 2025/0173619 A1 | 5/2025 | Cresswell et al. |
| 2025/0173725 A1 | 5/2025 | Devarajan et al. |
| 2025/0181321 A1 | 6/2025 | Gormley |
| 2025/0182028 A1 | 6/2025 | Gormley |
| 2025/0182196 A1 | 6/2025 | Gormley |
| 2025/0182222 A1 | 6/2025 | Gormley |
| 2025/0191062 A1 | 6/2025 | Heglin et al. |
| 2025/0217175 A1 | 7/2025 | Karbasi et al. |
| 2025/0225560 A1 | 7/2025 | Bajaj et al. |
| 2025/0231668 A1 | 7/2025 | Tao et al. |
| 2025/0231750 A1 | 7/2025 | Lim et al. |
| 2025/0231774 A1 | 7/2025 | Tao et al. |
| 2025/0231775 A1 | 7/2025 | Tao et al. |
| 2025/0231793 A1 | 7/2025 | Lim et al. |
| 2025/0232130 A1 | 7/2025 | Tao et al. |
| 2025/0232351 A1 | 7/2025 | Tao et al. |
| 2025/0232375 A1 | 7/2025 | Tao et al. |
| 2025/0232376 A1 | 7/2025 | Tao et al. |
| 2025/0232377 A1 | 7/2025 | Tao et al. |
| 2025/0232503 A1 | 7/2025 | Lim et al. |
| 2025/0238536 A1 | 7/2025 | Nikoghossian et al. |
| 2025/0245071 A1 | 7/2025 | Ionescu et al. |
| 2025/0245511 A1 | 7/2025 | D'Agostino et al. |

OTHER PUBLICATIONS

Yuan et al. "No More Manual Tests? Evaluating and Improving ChatGPT for Unit Test Generation", arXiv [online], May 2023, retrieved May 31, 2025, https://arxiv.org/pdf/2305.04207v1.

\* cited by examiner

| 152 | 154 Input | 156 Expected Result | 158 Actual Result | 160 |
|---|---|---|---|---|
| Verify Four Text Boxes on the GUI to Accommodate 16 Digit Card Number | Enter 4 Digits in a Text Box and Check for Automatic Movement of Cursor to Next Box | Once the 4 Digits are Entered in the Text Box, the Cursor Should Automatically Move to the Next Text Box | | Pass / Fail |
| | Check with a Valid 16 Digit Card Number | Four Text Boxes to be Displayed and 16 Digits to Input with 4 Digits to be Input in Each Text Box | | Pass / Fail |
| | Check with an Invalid 20 Digit Card Number | Four Text Boxes to be Displayed and 16 Digits to input with 4 Digits to be Input in Each Text Box, the User should not be able to enter the last 4 Digits | | Pass / Fail |
| | Check with an Invalid 13 Digit Card Number | Four Text Boxes with 13 Digits including with 4 Digits in the first 3 Text Boxes and one digit in last box. An error message should be displayed | | Pass / Fail |

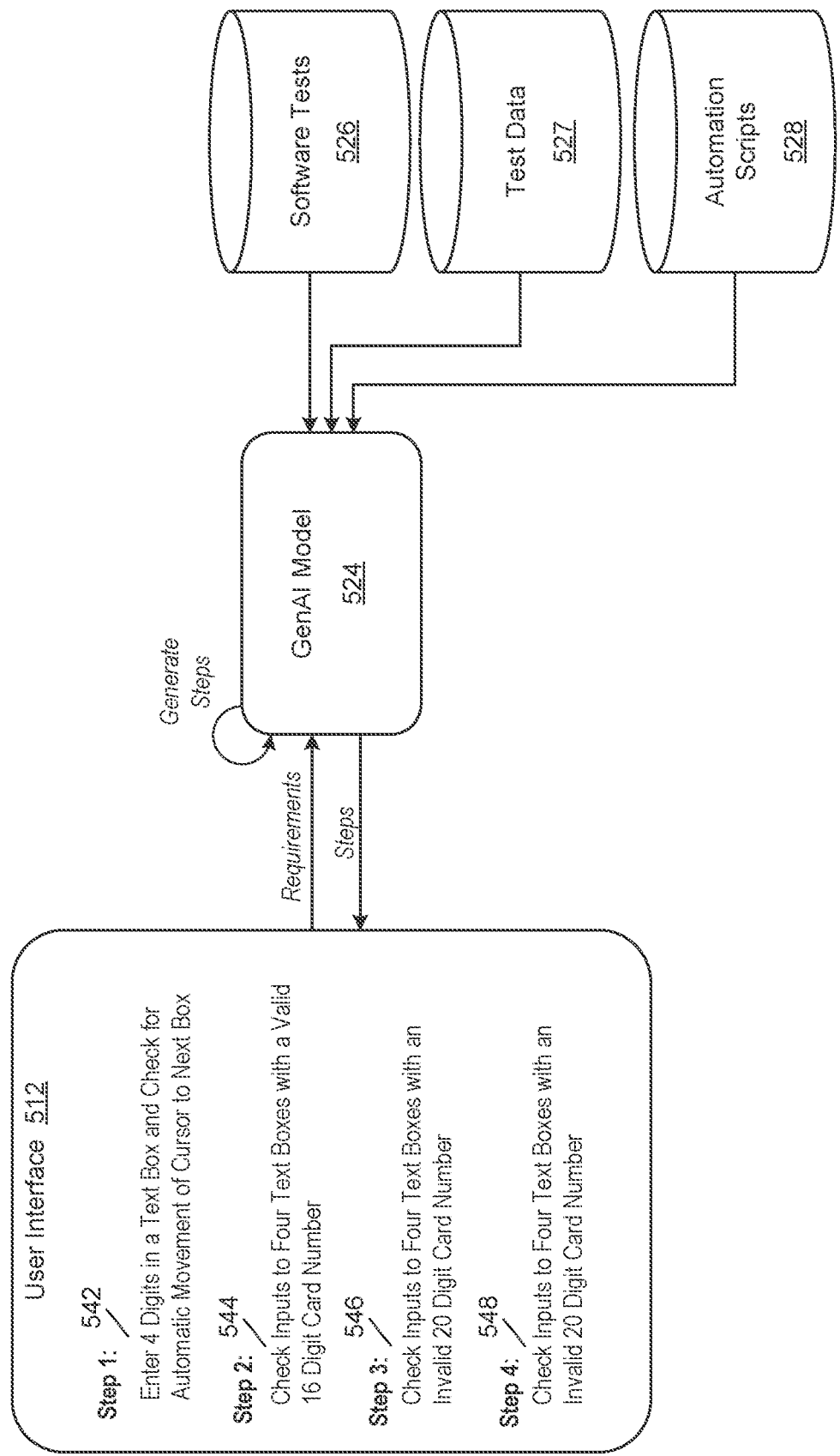

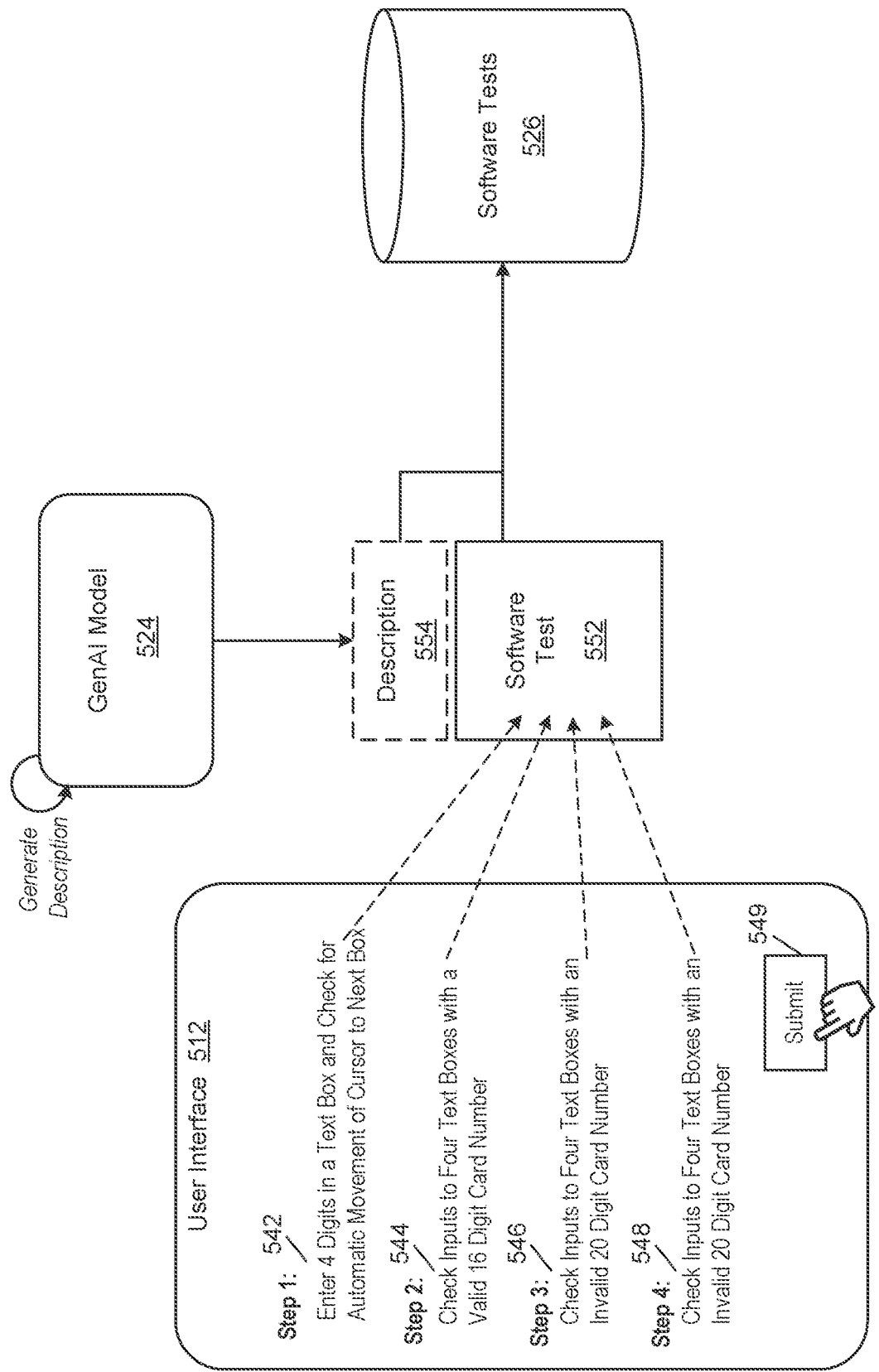

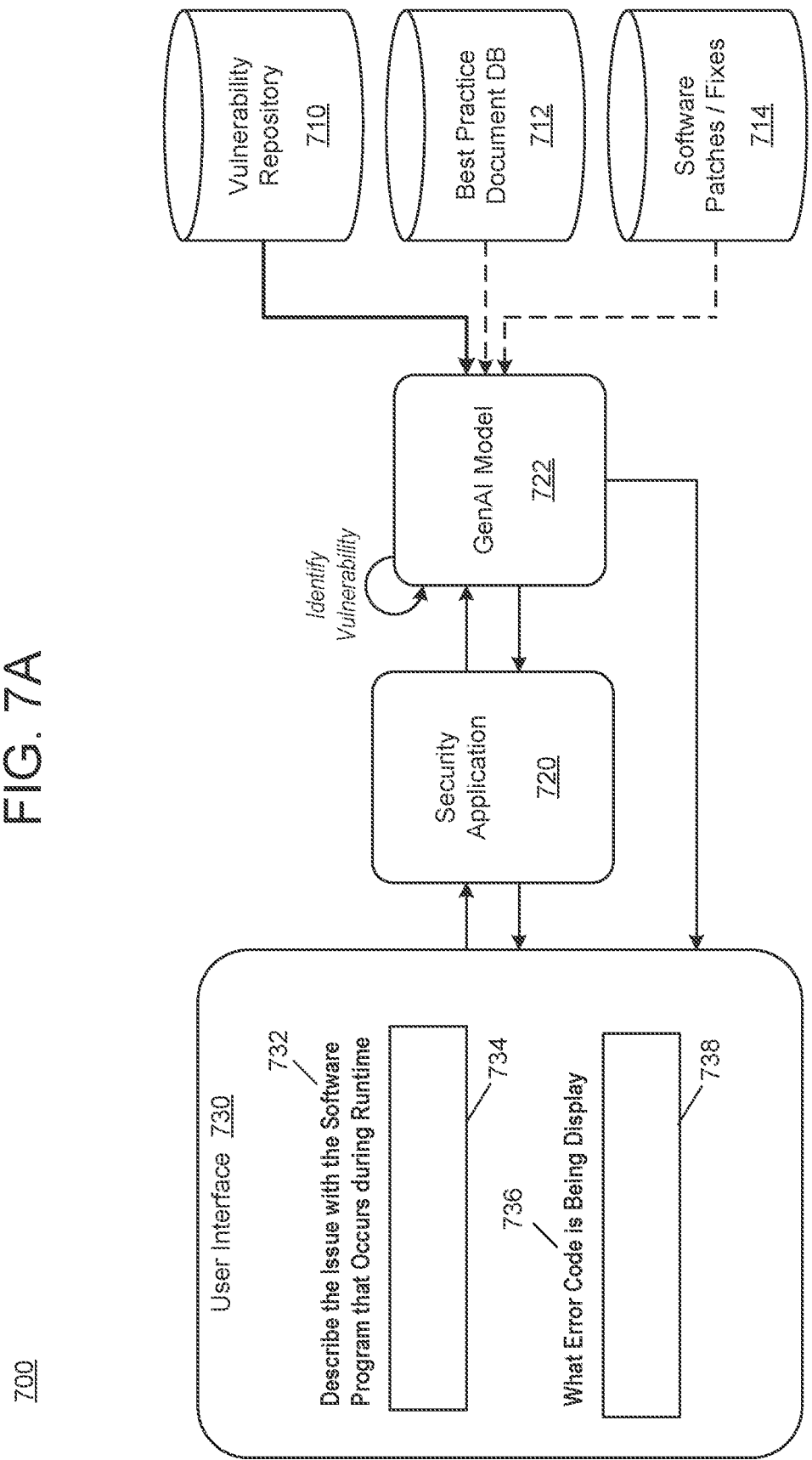

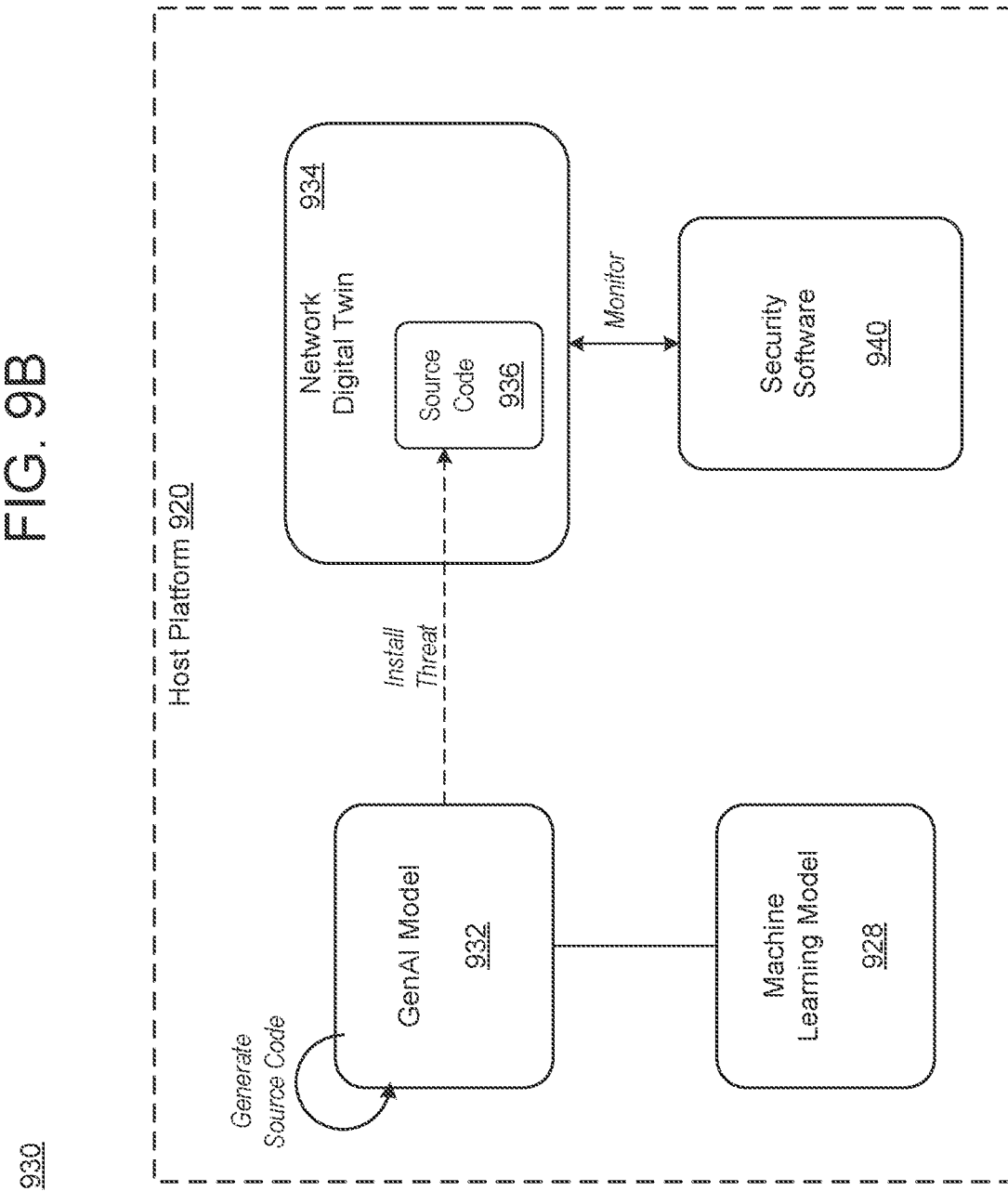

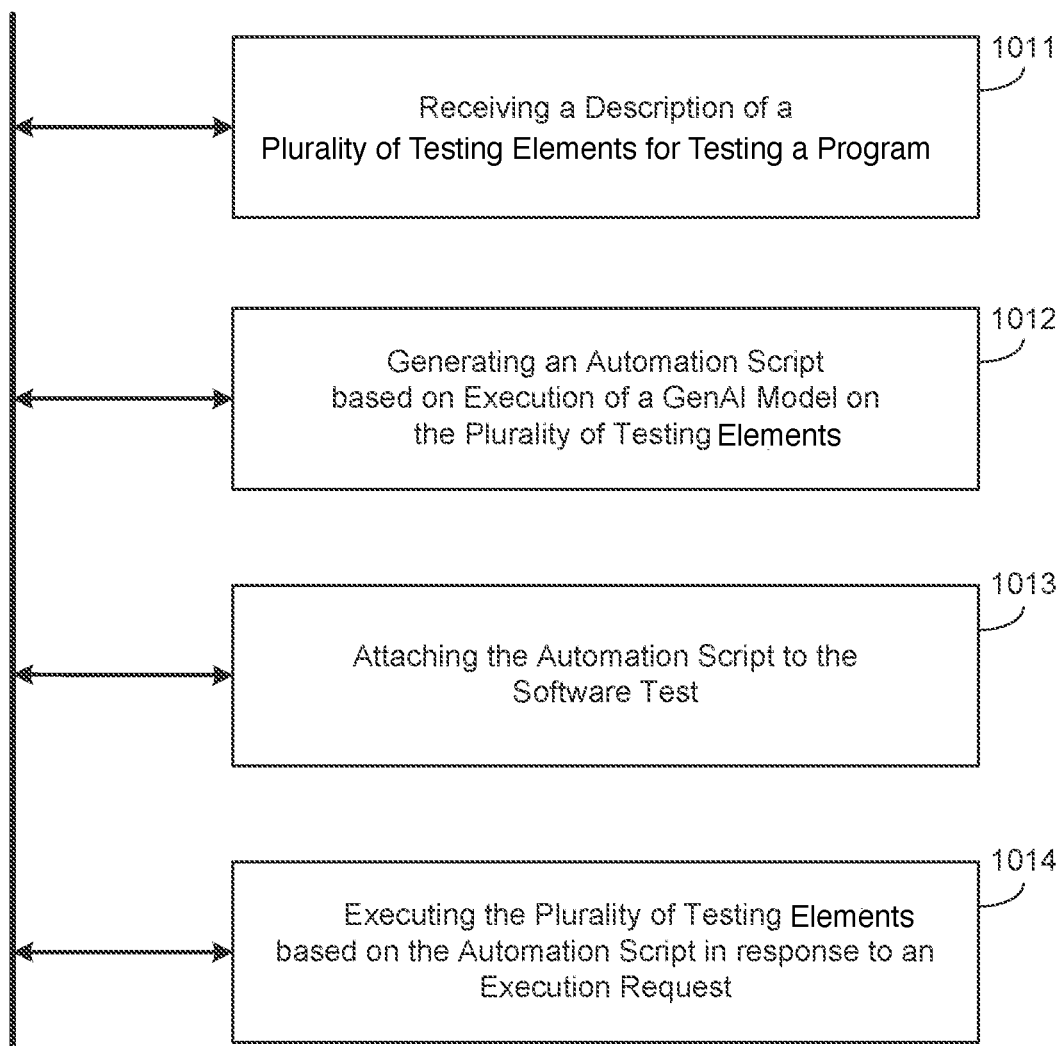

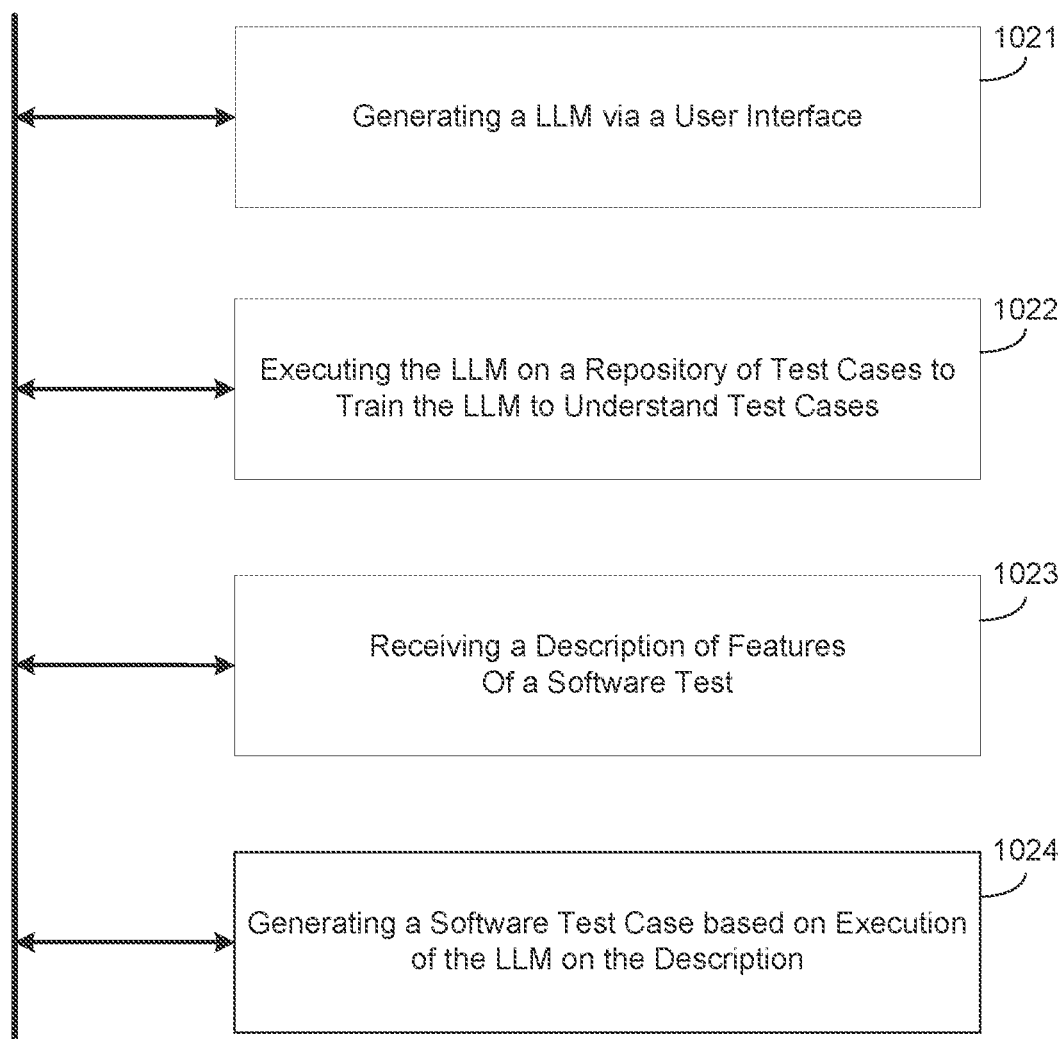

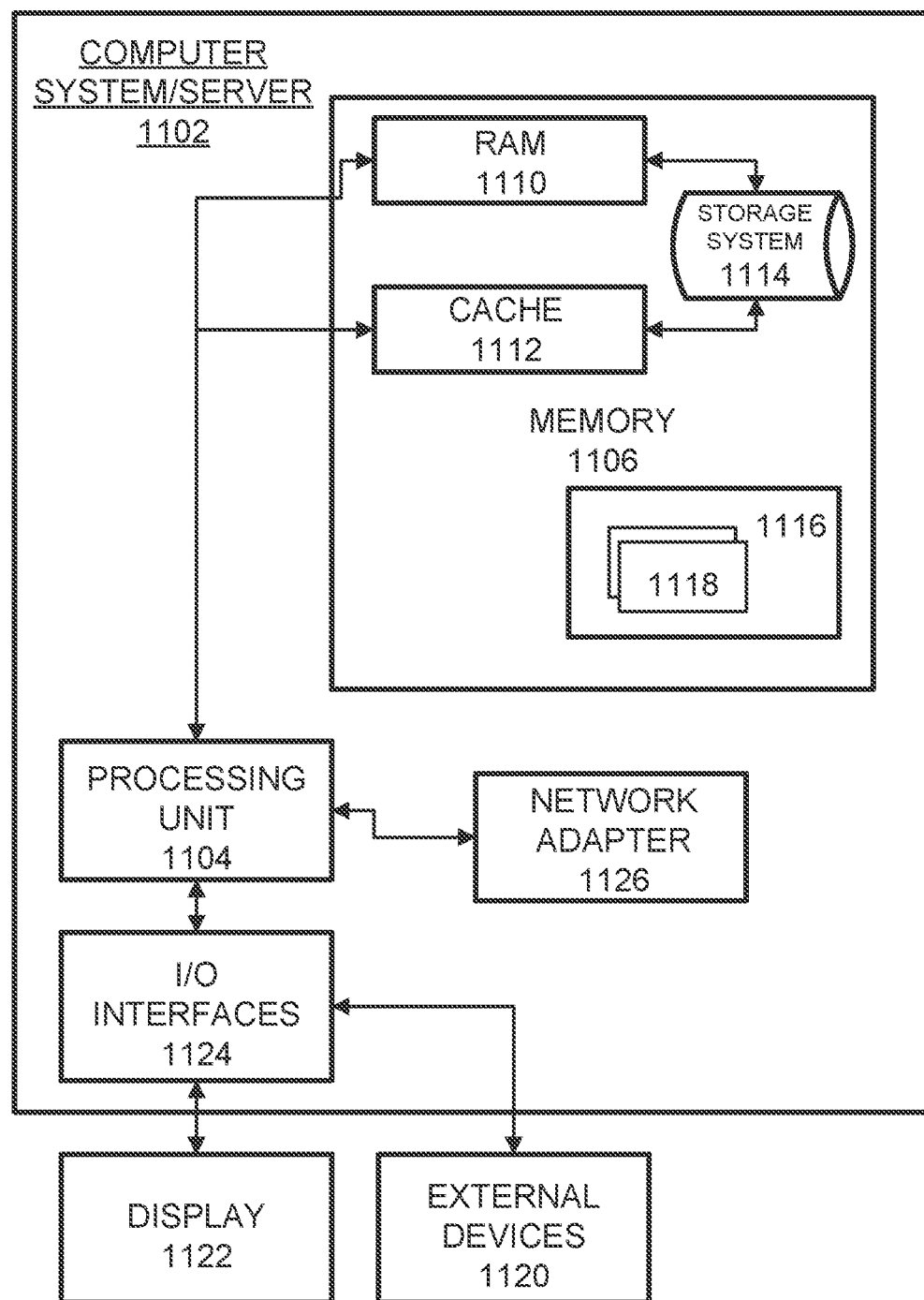

CORRECTING SECURITY VULNERABILITIES WITH GENERATIVE ARTIFICIAL INTELLIGENCE

BACKGROUND

Software testing is a process of checking whether an actual software program matches the expected requirements. During testing, a developer may use a testing tool, such as a software application, to evaluate one or more points of interest within the software program being tested. For example, the testing tool can identify gaps, missing requirements, etc., within the source code based on the execution of the software program in contrast to actual requirements, and the developer can submit fixes to repair or correct the defects and bugs. The testing may be repeated until the developer reaches a quality threshold that is acceptable. It has been shown that better-quality software tests shorten testing time. However, such tests require significant manual contribution of a developer(s).

SUMMARY

One example embodiment provides an apparatus that may include a memory, a network interface configured to receive a request to test a software program stored in the memory from a user device, the request comprising a description of requirements of the software program, and a processor coupled to the memory and the network interface, the processor configured to generate a plurality of testing elements based on execution of a generative artificial intelligence (GenAI) model on the description of the requirements of the software program and a repository of test cases, generate a test case for testing the software program where the test case comprises the plurality of testing elements generated by the GenAI model, and store the test case within the memory.

Another example embodiment provides a method that includes one or more of receiving a request to test a software program from a user device, the request comprising a description of requirements of the software program, generating a plurality of testing elements based on execution of a generative artificial intelligence (GenAI) model on the description of the requirements of the software program and a repository of test cases, generating a test case for testing the software program where the test case comprises the plurality of testing elements generated by the GenAI model, and storing the test case within a storage device.

A further example embodiment provides a computer-readable medium comprising instructions, that when read by a processor, cause the processor to perform one or more of receiving a request to test a software program from a user device, the request comprising a description of requirements of the software program, generating a plurality of testing elements based on execution of a generative artificial intelligence (GenAI) model on the description of the requirements of the software program and a repository of test cases, generating a test case for testing the software program where the test case comprises the plurality of testing elements generated by the GenAI model, and storing the test case within a storage device.

A further example embodiment provides an apparatus that may include a memory, and a processor coupled to the memory, the processor configured to receive a description of a plurality of testing elements for testing a software program and storing the software test within the memory, generate an automation script for automating execution of the software test based on execution of a generative artificial intelligence model (GenAI) model on the plurality of testing elements and a repository of automation scripts stored in the memory, attach the automation script to the software test within the memory, and in response to a request to execute the software test, execute the plurality of testing elements within the software test based on the attached automation script.

A further example embodiment provides a method that includes one or more of receiving a description of a plurality of testing elements for testing a software program and storing the software test within a storage device, generating an automation script for automating execution of the software test based on execution of a generative artificial intelligence model (GenAI) model on the plurality of testing elements and a repository of automation scripts, attaching the automation script to the software test within the storage device, and in response to a request to execute the software test, executing the plurality of testing elements within the software test based on the attached automation script.

A further example embodiment provides a computer-readable medium comprising instructions, that when read by a processor, cause the processor to perform one or more of receiving a description of a plurality of testing elements for testing a software program and storing the software test within a storage device, generating an automation script for automating execution of the software test based on execution of a generative artificial intelligence model (GenAI) model on the plurality of testing elements and a repository of automation scripts, attaching the automation script to the software test within the storage device, and in response to a request to execute the software test, executing the plurality of testing elements within the software test based on the attached automation script.

A further example embodiment provides an apparatus that may include a memory, a display, and a processor coupled to the memory and the display, the processor configured to: generate a large language model via a user interface and store the large language model in the memory, execute the large language model on a repository of software test cases and requirements of the software test cases to train the large language model to understand connections between test case components and test case requirements and store the trained large language model in the memory, receive a description of features of a software program to be tested, and in response to receiving the description of the features, generate a software test case based on execution of the large language model on the received descriptions, and display on the display the software test case via a user interface.

A further example embodiment provides a method that includes one or more of generating a large language model via a user interface, executing the large language model on a repository of software test cases and requirements of the software test cases to train the large language model to understand connections between test case components and test case requirements, receiving a description of features of a software program to be tested; and in response to receiving the description of the features, generating a software test case based on execution of the large language model on the received descriptions, and displaying the software test case via the user interface.

A further example embodiment provides a computer-readable medium comprising instructions, that when read by a processor, cause the processor to perform one or more of generating a large language model via a user interface, executing the large language model on a repository of software test cases and requirements of the software test cases to train the large language model to understand connections between test case components and test case requirements, receiving a description of features of a software program to be tested; and in response to receiving the description of the features, generating a software test case based on execution of the large language model on the received descriptions, and displaying the software test case via the user interface.

A further example embodiment provides an apparatus that may include a memory configured to store a log file, a display, and a processor coupled to the memory and the display, the processor configured to execute tests on a software application stored in the memory and running on the apparatus via a test environment of a test platform and log results of the tests in the log file, identify a new feature to be added to the software application based on execution of a machine learning model on logged results of the tests stored in the log file, generate source code for the new feature to be added to the software application based on execution of a generative artificial intelligence (GenAI) model on the new feature and a repository of source code stored in the memory, and display the generated source code on the display via a user interface of the software application.

A further example embodiment provides a method that includes one or more of executing tests on a software application via a test environment of a test platform and logging results of the tests in a log file, identifying a new feature to be added to the software application based on execution of a machine learning model on logged results of the tests stored in the log file, generating source code for the new feature to be added to the software application based on execution of a generative artificial intelligence (GenAI) model on the new feature and a repository of source code, and displaying the generated source code via a user interface of the software application.

A further example embodiment provides a computer-readable medium comprising instructions, that when read by a processor, cause the processor to perform one or more of executing tests on a software application via a test environment of a test platform and logging results of the tests in a log file, identifying a new feature to be added to the software application based on execution of a machine learning model on logged results of the tests stored in the log file, generating source code for the new feature to be added to the software application based on execution of a generative artificial intelligence (GenAI) model on the new feature and a repository of source code, and displaying the generated source code via a user interface of the software application.

A further example embodiment provides an apparatus that may include a memory comprising a repository of source code, and a processor configured to monitor communications that occur with user devices over a shared computer network, detect a security threat from the monitored communications, generate a software program to simulate the security threat over the shared computer network based on execution of a generative artificial intelligence (GenAI) model on the repository of source code and a description of the security threat, install the source code for simulating the security threat on a system associated with the computer network, and execute the source code for simulating the security threat via the system.

A further example embodiment provides a method that includes one or more of monitoring communications that occur with user devices over a shared computer network, detecting a security threat from the monitored communications, generating a software program to simulate the security threat over the shared computer network based on execution of a generative artificial intelligence (GenAI) model on a description of the security threat and a repository of source code, installing the source code for simulating the security threat on a system associated with the computer network, and executing the source code for simulating the security threat via the system.

A further example embodiment provides a computer-readable medium comprising instructions, that when read by a processor, cause the processor to perform one or more of monitoring communications that occur with user devices over a shared computer network, detecting a security threat from the monitored communications, generating a software program to simulate the security threat over the shared computer network based on execution of a generative artificial intelligence (GenAI) model on a description of the security threat and a repository of source code, installing the source code for simulating the security threat on a system associated with the computer network, and executing the source code for simulating the security threat via the system.

A further example embodiment provides an apparatus that may include a memory, a display, and a processor coupled to the memory and the display, the processor configured to receive, via a user interface, a request to test a software program that is stored in the memory, read source code of the software program from the memory and identify a vulnerability in the source code based on the reading, generate repair code for fixing the identified vulnerability based on execution of a generative artificial intelligence (GenAI) model on the source code and a repository of repair code stored in the memory which is used to repair previous vulnerabilities, and display on the display information about the repair code via the user interface.

A further example embodiment provides a method that includes one or more of receiving, via a user interface, a request to test a software program, reading source code of the software program and identifying a vulnerability in the source code based on the reading, generating repair code for fixing the identified vulnerability based on execution of a generative artificial intelligence (GenAI) model on the source code and a repository of repair code used to repair previous vulnerabilities, and displaying information about the repair code via the user interface.

A further example embodiment provides a computer-readable medium comprising instructions, that when read by a processor, cause the processor to perform one or more of receiving, via a user interface, a request to test a software program, reading source code of the software program and identifying a vulnerability in the source code based on the reading, generating repair code for fixing the identified vulnerability based on execution of a generative artificial intelligence (GenAI) model on the source code and a repository of repair code used to repair previous vulnerabilities, and displaying information about the repair code via the user interface.

BRIEF DESCRIPTION OF THE DRAWINGS

FIGS. 5A-5D are diagrams illustrating a process of generating a software test according to example embodiments.

FIGS. 7A-7C are diagrams illustrating a process of identifying and testing a software vulnerability according to example embodiments.

FIGS. 9A-9B are diagrams illustrating a process of detecting a security threat and simulating the security threat on a computer network according to example embodiments.

FIG. 10B is a diagram illustrating a method of generating an automation script for executing a software test according to example embodiments.

FIG. 10C is a diagram illustrating a method of training a large language model to understand software test cases and automation scripts according to example embodiments.

FIG. 11 is a diagram illustrating a computing system that may be used in any of the example embodiments described herein.

DETAILED DESCRIPTION

Figure 1:
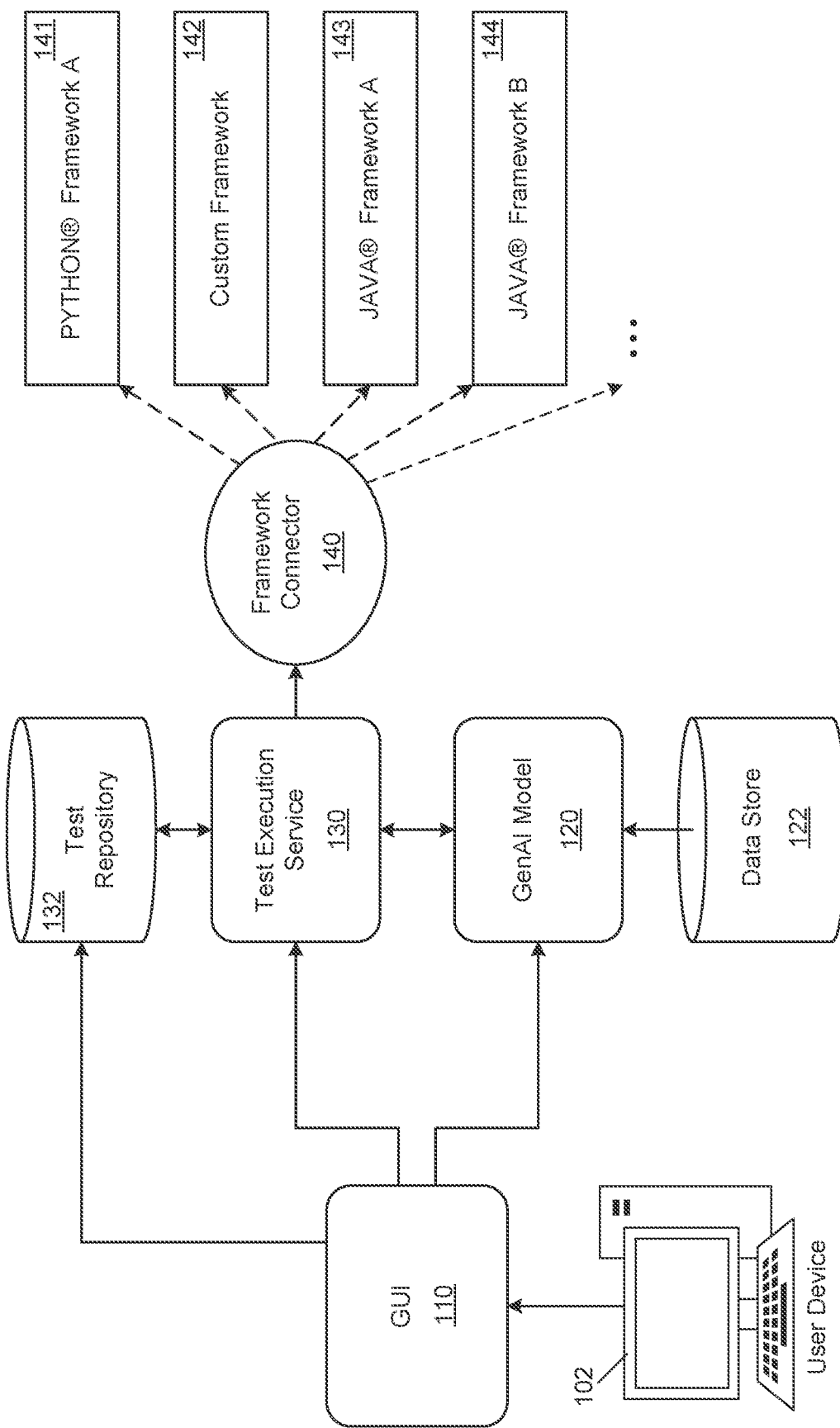
FIG. 1A is a diagram illustrating a generative artificial intelligence (GenAI) computing environment for generating test cases according to example embodiments.
FIG. 1B is a diagram illustrating an example of a software test case generated by GenAI according to example embodiments.

It is to be understood that although this disclosure includes a detailed description of cloud computing, implementation of the teachings recited herein is not limited to a cloud computing environment. Instead, embodiments of the instant solution can be implemented in conjunction with any other computing environment now known or later developed.

The example embodiments are directed to a platform that can generate/design software tests, automation scripts for testing software, source code, software patches, and the like. In some embodiments, a generative artificial intelligence (GenAI) model may be trained to understand software tests, scripts, source code, and the like based on a large corpus of software tests, best practice documentation, software architecture documentation, and the like. The GenAI model may learn a correlation between text (e.g., words) and software test components, script components, and the like through the training process. Furthermore, the GenAI model may also generate new software tests based on descriptions thereof, such as a description of the requirements of the software test.

The example embodiments enable using GenAI models to enhance the test design process. This innovative approach facilitates requirement elaboration, test scenario design, and automated test script creation. By harnessing the power of generative AI, the example embodiments provide a system that can significantly reduce human intervention and errors while speeding up the test design phase.

Traditionally, a quality assurance engineer is responsible for maintaining the infrastructure needed for test execution, often resulting in a monolithic application. The platform described herein revolutionizes this process by providing a web service/cloud-based service that hosts multiple testing frameworks/programming languages, allowing tests to be executed on-demand (in any of the frameworks/programming languages) without requiring QA engineers to manage the infrastructure. This approach improves test development efficiency and enables seamless AI-powered test design process integration.

By leveraging the power of Generative AI and automation testing as a service, the example embodiments provide a platform that can significantly streamline the QA process, allowing for faster test design and execution. In addition, the system described herein can reduce human intervention within the test design process, thereby reducing the chances for human errors and inconsistencies, leading to more reliable and accurate test results. The platform also offers a scalable solution that can adapt to the ever-changing software development requirements, ensuring that the QA process remains efficient and effective. In addition, by eliminating the need for QA engineers to manage the infrastructure and reducing errors in the test design process, the system offers considerable cost savings for organizations.

According to various embodiments, the GenAI model may be a large language model (LLM), such as a multimodal large language model. As another example, the GenAI model may be a transformer neural network ("transformer") or the like. The GenAI model can understand connections between text and components (e.g., boxes, lines, arrows, software architecture, etc.) within software architecture drawings. For example, the GenAI model may include libraries and deep learning frameworks that enable the GenAI model to create software tests, activation scripts, source code, etc., based on text inputs.

By creating software tests from natural language descriptions, the GenAI model can relieve a user from generating such tests manually. Furthermore, the GenAI model described herein can learn activation scripts for executing the software tests "automatically" on the software program being tested.

Here, the GenAI model may build a software test and/or an automation script for executing the software test.

Furthermore, the GenAI model described herein can be integrated within a larger artificial intelligence system that includes machine learning and artificial intelligence models, other GenAI models, and the like. This system can perform additional functionality through the testing process/testing environment. For example, new product features can be identified based on the software program attributes being tested. As another example, security vulnerabilities can be detected from the testing, and repairs can be generated and even tested using a combination of models.

FIG. 1A illustrates a GenAI computing environment 100 that includes a system for generating test cases according to example embodiments. In the example of FIG. 1A, the system includes a test execution service 130 that hosts a software testing environment and can execute software tests stored in a test repository 132. In the example embodiments, the test execution service 130 can execute a test in any of multiple different frameworks/different programming languages, including PYTHON®, JAVA®, C++, and the like.

According to various embodiments, the test execution service 130 is coupled to a framework connector 140 (software program), which manages the execution of the software tests via a plurality of different frameworks 141, 142, 143, and 144. Each framework may include a collection of tools and software libraries necessary for the framework. Here, the framework connector can connect the test execution service 130 to the proper testing framework (from among the plurality of different frameworks 141, 142, 143, and 144) based on a user request or in an automated way. Each framework may create test scripts by developing required code or running commands in the test environment of the respective framework.

In addition, the system includes a GenAI model 120 trained to generate software test cases from input data. As another example, the GenAI model 120 may generate automation scripts for executing software test cases in an automated manner. As another example, the GenAI model 120 may generate source code such as code that can be used to repair a vulnerability in a software program, code that can be used to simulate a security threat such as a virus, cyber-attack, etc., and the like. The GenAI model 120 may be hosted by a host platform that also hosts the test execution service 130. Further, the GenAI model 120 may communicate with the test execution service 130 directly via API calls or the like. In this example, the GenAI model 120 may include a data store 122 with a repository of software tests, automation scripts, source code, vulnerability code, software patches, and the like.

The data store 122 may be accessed during the execution of the GenAI model 120.

In addition, the system includes a user interface 110 that is output by the test execution service 130. For example, the user interface 110 may be included in a front-end of the software application shown on a user device 102 screen that accesses the host platform and the test execution service via a computer network such as the Internet. The user interface 110 may include controls that can be used to build software tests, perform software testing, develop automation scripts, and the like.

FIG. 1B illustrates an example of a software test case 150 generated by the GenAI model 120 in FIG. 1A, according to example embodiments. Referring to FIG. 1B, the software test case 150 includes a diagram with a plurality of boxes/cells identifying the actions to be taken. For example, a first column 152 in the software test case includes a description of the overall purpose of the test case. In this case, the test case is a test of four separate text boxes on a graphical user interface of a software application that receives four input characters, each corresponding to a 16-digit payment card number.

The test case also includes additional components, including four input activities to be performed during testing, as indicated in the four cells in column 154. The four input activities describe what will be performed during the testing input. In addition, the four input activities in the column 154 are paired with four expected results in column 156. In this example, the software test also includes a column 158 for actual results observed during the testing process and a column 160 indicating each input activity's pass/fail status. Here, the four cells in column 158 are to be filled in by the test, and the four cells in column 160 are to be selected after the rest have been performed.

Figure 2:
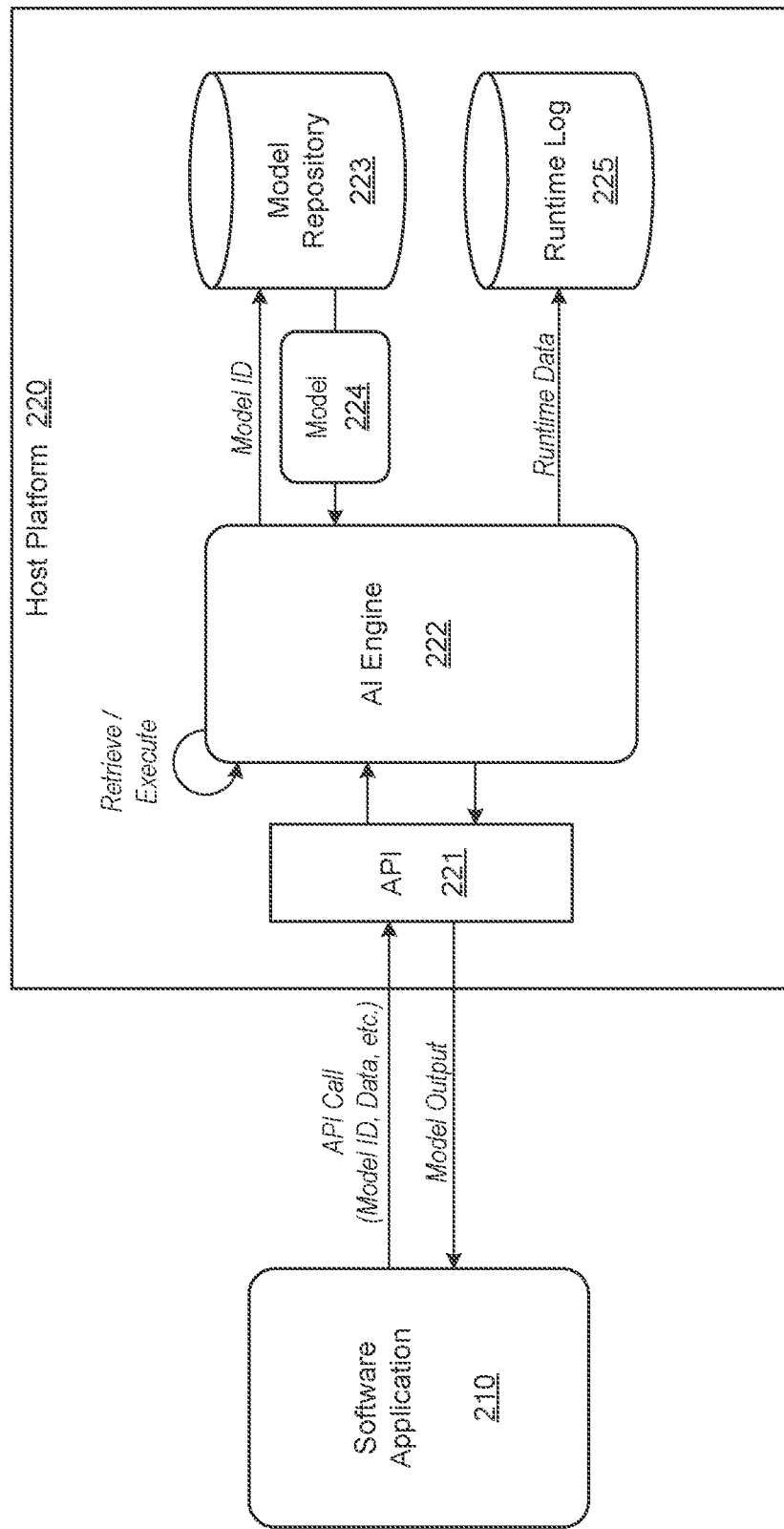
FIG. 2 is a diagram illustrating a process of executing a predictive model on input content according to example embodiments.

FIG. 2 illustrates a process 200 of executing a model 224 on input content according to example embodiments. For example, the model 224 may be the GenAI model 120 described concerning FIG. 1A, however, embodiments are not limited to it.

Referring to FIG. 2, a software application 210 may request execution of the model 224 by submitting a request to the host platform 220. In response, an AI engine 222 may receive the request and trigger the model 224 to execute within a runtime environment of the host platform 220.

In FIG. 2, the AI engine 222 may control access to models stored within the model repository 223. For example, the models may include GenAI models, AI models, machine learning models, neural networks, and/or the like. The software application 210 may trigger execution of the model 224 from the model repository 223 via submission of a call to an API 221 (application programming interface) of the AI engine 222. The request may include an identifier of the model 224, such as a unique ID assigned by the host platform 220, a payload of data (e.g., to be input to the model during execution), and the like. The AI engine 222 may retrieve the model 224 from the model repository 223 in response, and deploy the model 224 within a live runtime environment. After the model is deployed, the AI engine 222 may execute the running instance of the model 224 on the payload of data, and return a result of the execution to the software application 210.

In some embodiments, the data payload may be a format that cannot be input to the model 224 nor read by a computer processor. For example, the data payload may be text, image, audio, etc. In response, the AI engine 222 may convert the data payload into a format readable by the model 224, such as a vector or other encoding.

The vector may then be input to the model 224.

In some embodiments, the software application 210 may display a user interface that enables a user to provide feedback from the output provided by the model 224. For example, a user may input a confirmation that the test case generated by a GenAI model is correct or includes incorrect content. This information may be added to the results of execution and stored within a log 225. The log 225 may include an identifier of the input, an identifier of the output, an identifier of the model used, and feedback from the recipient. This information may be used to subsequently retrain the model.

Figure 3A:
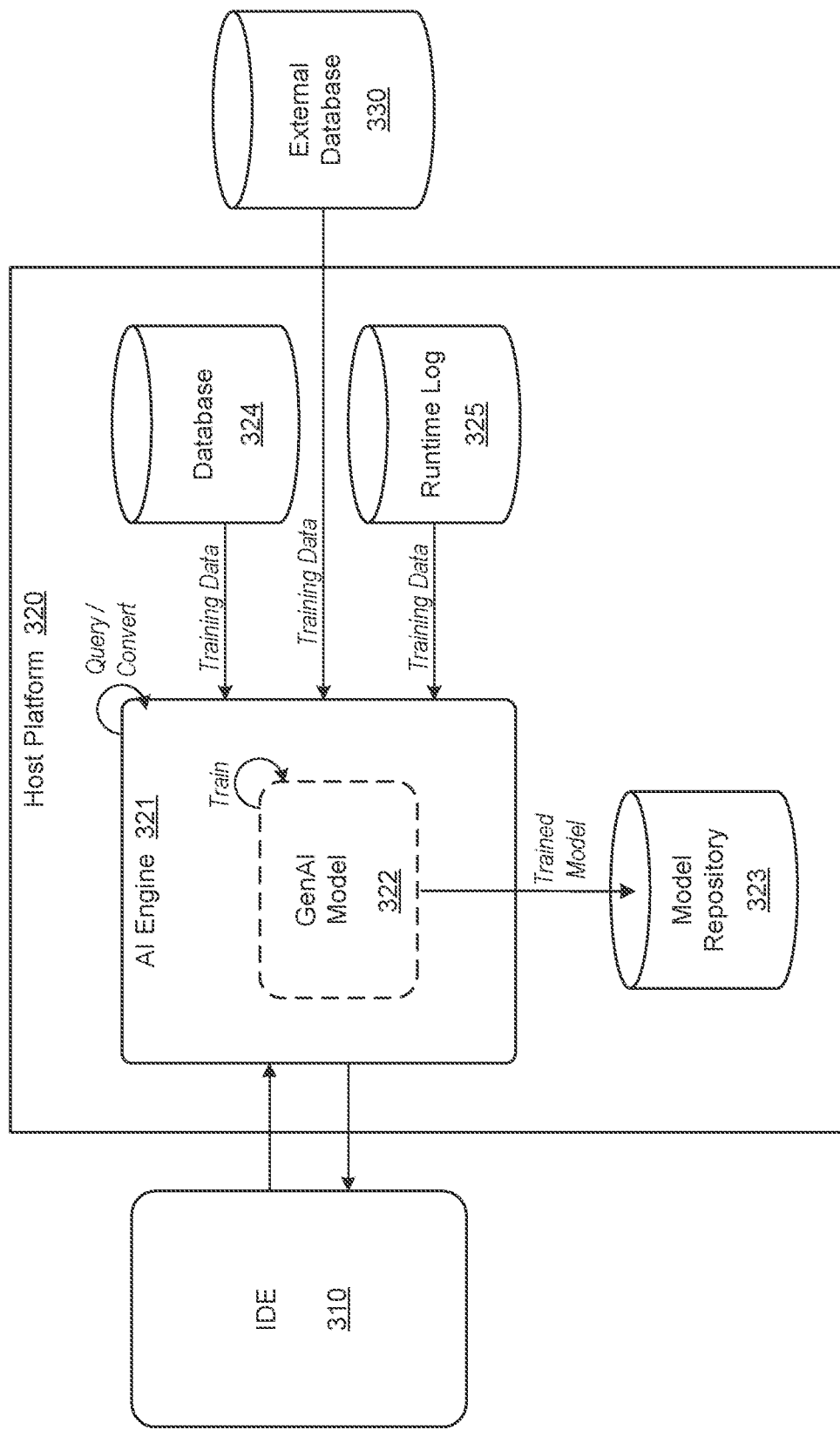
FIGS. 3A-3C are diagrams illustrating processes for training an artificial intelligence (AI) model according to example embodiments.

FIG. 3A illustrates a process 300A of training a GenAI model 322 according to example embodiments. However, it should be appreciated that the process 300A shown in FIG. 3A also applies to other models, such as machine learning models, AI models, and the like. Referring to FIG. 3A, a host platform 320, may host an IDE 310 (integrated development environment) where GenAI models, machine learning models, AI models, and the like may be developed, trained, retrained, and the like. In this example, the IDE 310 may include a software application with a user interface accessible by a user device over a network or through a local connection.

For example, the IDE 310 may be embodied as a web application that can be accessed at a network address, URL, etc., by a device. As another example, the IDE 310 may be locally or remotely installed on a computing device used by a user.

The IDE 310 may be used to design a model (via a user interface of the IDE), such as a generative artificial intelligence model that can receive text as input and generate custom imagery, etc. The model can then be executed/trained based on the training data established via the user interface. For example, the user interface may be used to build a new model. The training data for training such a new model may be provided from a training data store such as a database 324, which includes training samples from the web, customers, and the like. As another example, the training data may be pulled from one or more external data stores 330 such as publicly available sites, etc.

The GenAI model 322 may be executed on training data via an AI engine 321 of the host platform 320 during training. The training data may include a large corpus of text from software tests, best practice documentation, compliance documentation, etc. In the example embodiments, the training data may include software tests, source code, activation scripts, best practice documentation, compliance documentation, etc. The GenAI model 322 may learn mappings/connections between requirements associated with a software test and the components included within the software test case and can thus create software test cases from a description of the requirements of the software test case. When fully trained, the model may be stored within the model repository 323 via the IDE 310 or the like.

As another example, the IDE 310 may be used to retrain the GenAI model 322 after the model has already been deployed. Here, the training process may use executional results that have already been generated/output by the GenAI model 322 in a live environment (including any customer feedback, etc.) to retrain the GenAI model 322. For example, predicted outputs/images custom generated by the GenAI model 322 and the user feedback of the images may be used to retrain the model to enhance the images generated for all users. The responses may indicate whether the generated software architecture diagram is correct and, if not, what aspects of the diagram are incorrect. This data may be captured and stored within a runtime log 325 or other datastore within the live environment and can be subsequently used to retrain the GenAI model 322.

Figure 3B:
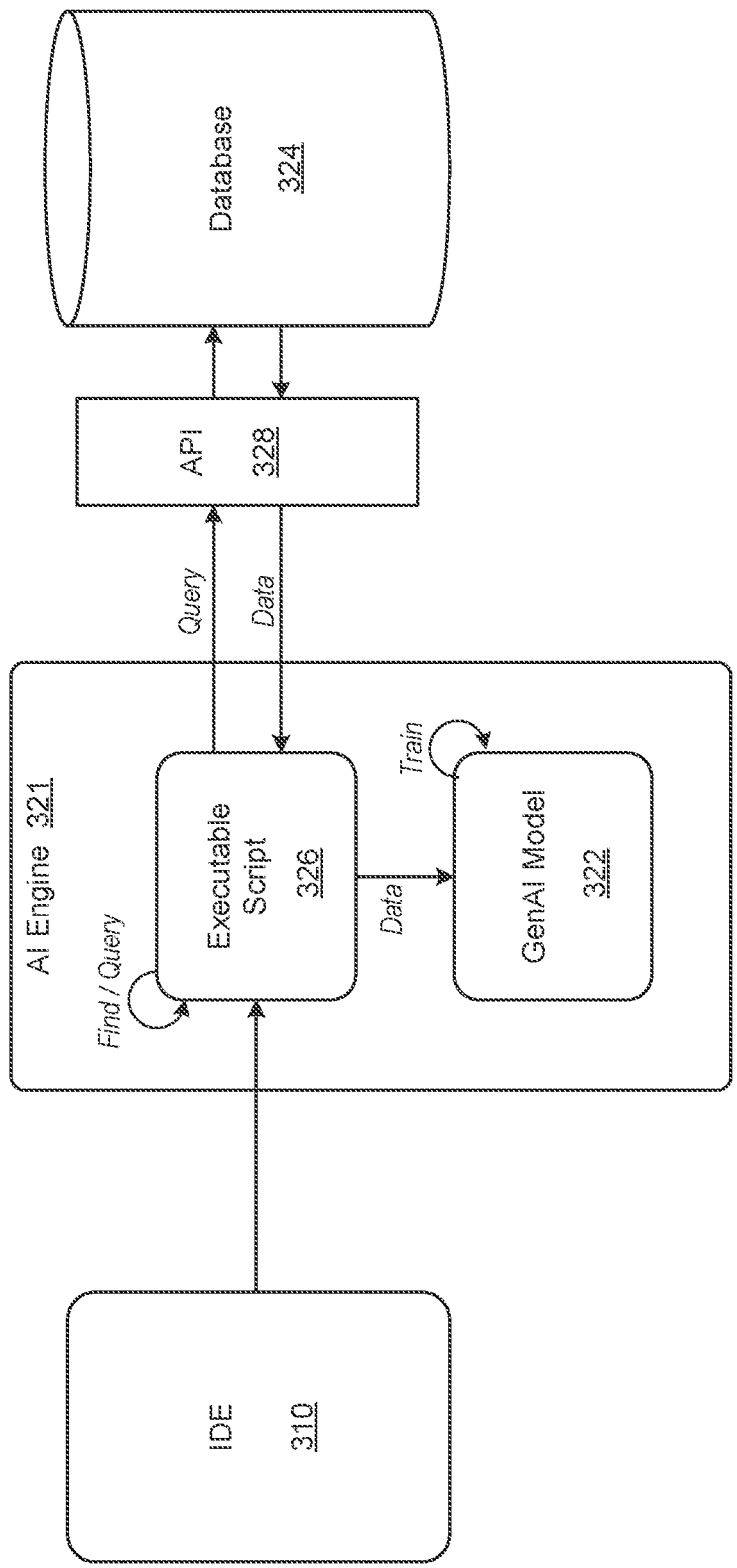

FIG. 3B illustrates a process 300B of executing a training process for training/retraining the GenAI model 322 via an AI engine 321. In this example, an executable script 326 is developed and configured to read data from a database 324 and input the data to the GenAI model 322 while the GenAI model is running/executing via the AI engine 321.

For example, the executable script 326 may use identifiers of data locations (e.g., table IDs, row IDs, column IDs, topic IDs, object IDs, etc.) to identify locations of the training data within the database 324 and query an API 328 of the database 324. In response, the database 324 may receive the query, load the requested data, and return it to the AI engine 321, which is input to the GenAI model 322. The process may be managed via a user interface of the IDE 310, which enables a human-in-the-loop during the training process (supervised learning). However, it should also be appreciated that the system is capable of unsupervised learning.

The executable script 326 may iteratively retrieve additional training data sets from the database 324 and iteratively input the additional training data sets into the GenAI model 322 during the execution of the model to continue to train the model. The script may continue until instructions within the script tell the script to terminate, which may be based on a number of iterations (training loops), total time elapsed during the training process, etc.

Figure 3C:
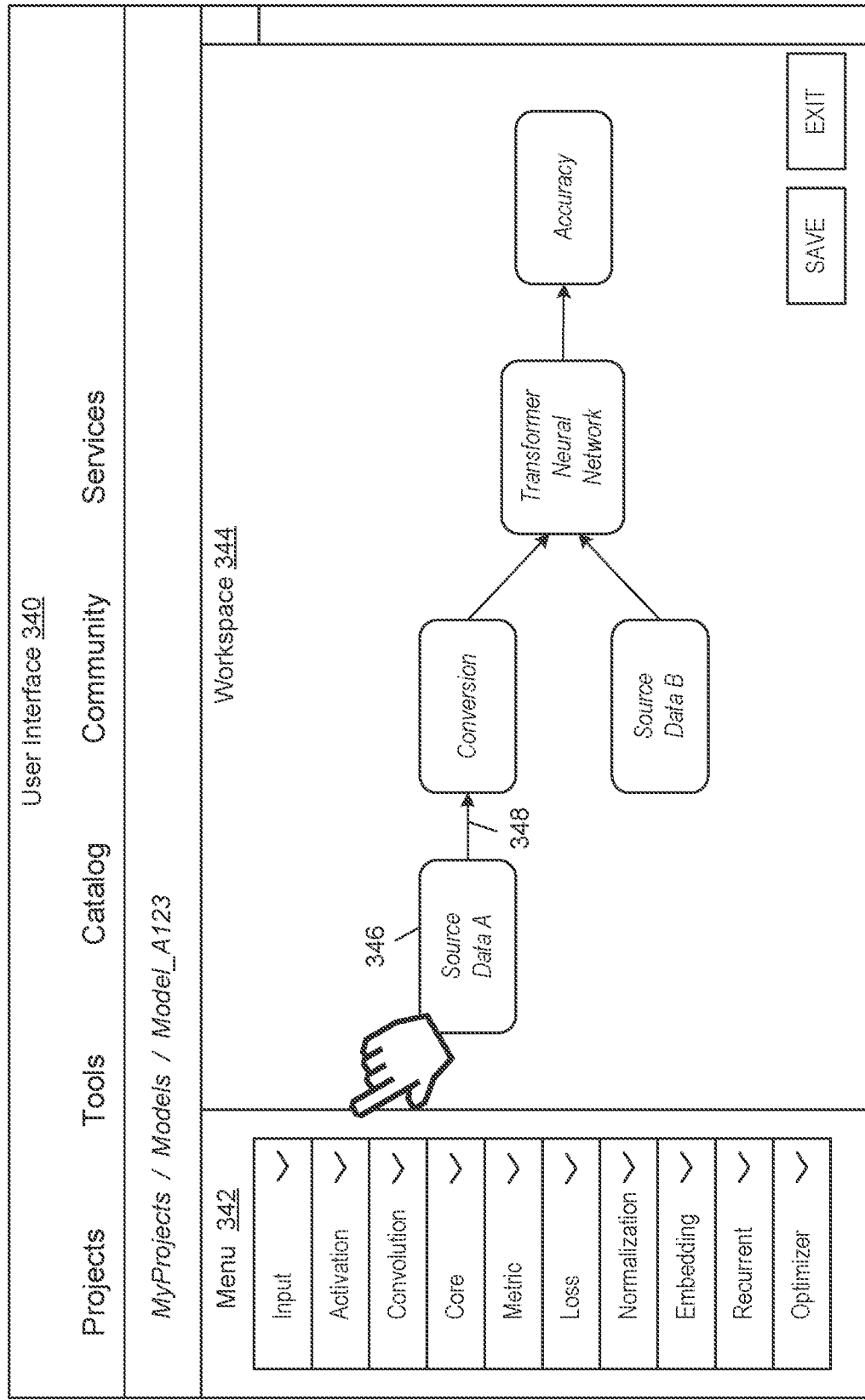

FIG. 3C illustrates a process 300C of designing a new AI model via a user interface 340 according to example embodiments. For example, the user interface 340 may be output as part of the software application that interacts with the IDE 310 shown in FIG. 3A, however, embodiments are not limited to it. Referring to FIG. 3C, a user can use an input mechanism to make selections from a menu 342 shown on the left-hand side of the user interface 340 to add pieces to the model such as data components, model components, analysis components, etc., within a workspace 344 of the user interface 340.

In the example of FIG. 3C, the menu 342 includes a plurality of graphical user interface (GUI) menu options, which can be selected to drill down into additional components that can be added to the model design shown in the workspace 344.

Here, the GUI menu options include options for adding features such as neural networks, machine learning models, AI models, data sources, conversion processes (e.g., vectorization, encoding, etc.), analytics, etc. The user can continue to add features to the model and connect them using edges or other means to create a flow within the workspace 344. For example, the user may add a node 346 to a new model diagram within the workspace 344. For example, the user may connect the node 346 to another node in the diagram via an edge 348, creating a dependency within the diagram. When the user is done, the user can save the model for subsequent training/testing.

According to various embodiments, the GenAI model described herein may be trained based on custom-defined prompts designed to draw out specific attributes associated with a software test, automation script, vulnerability, or the like. These same prompts may be output during the live execution of the GenAI model. For example, a user may input a software test description, such as the requirements that the software test will be expected to perform when testing a software program. The GenAI model can then use the requirements to generate a new software test. The prompts may be generated via prompt engineering that can be performed through the model training process, such as the model training process described above in the examples of FIGS. 3A-3C.

Prompt engineering is the process of structuring sentences (prompts) so that the GenAI model understands them. A prompt may ask for and receive a description of a testing feature to be included in a software test. The text may be input to the GenAI model and used to create a new software test that can be used to perform the testing feature described in the response to the prompt. Part of the prompting process may include delays/waiting times intentionally included within the script so the model has time to think/understand the input data.

Figure 4:
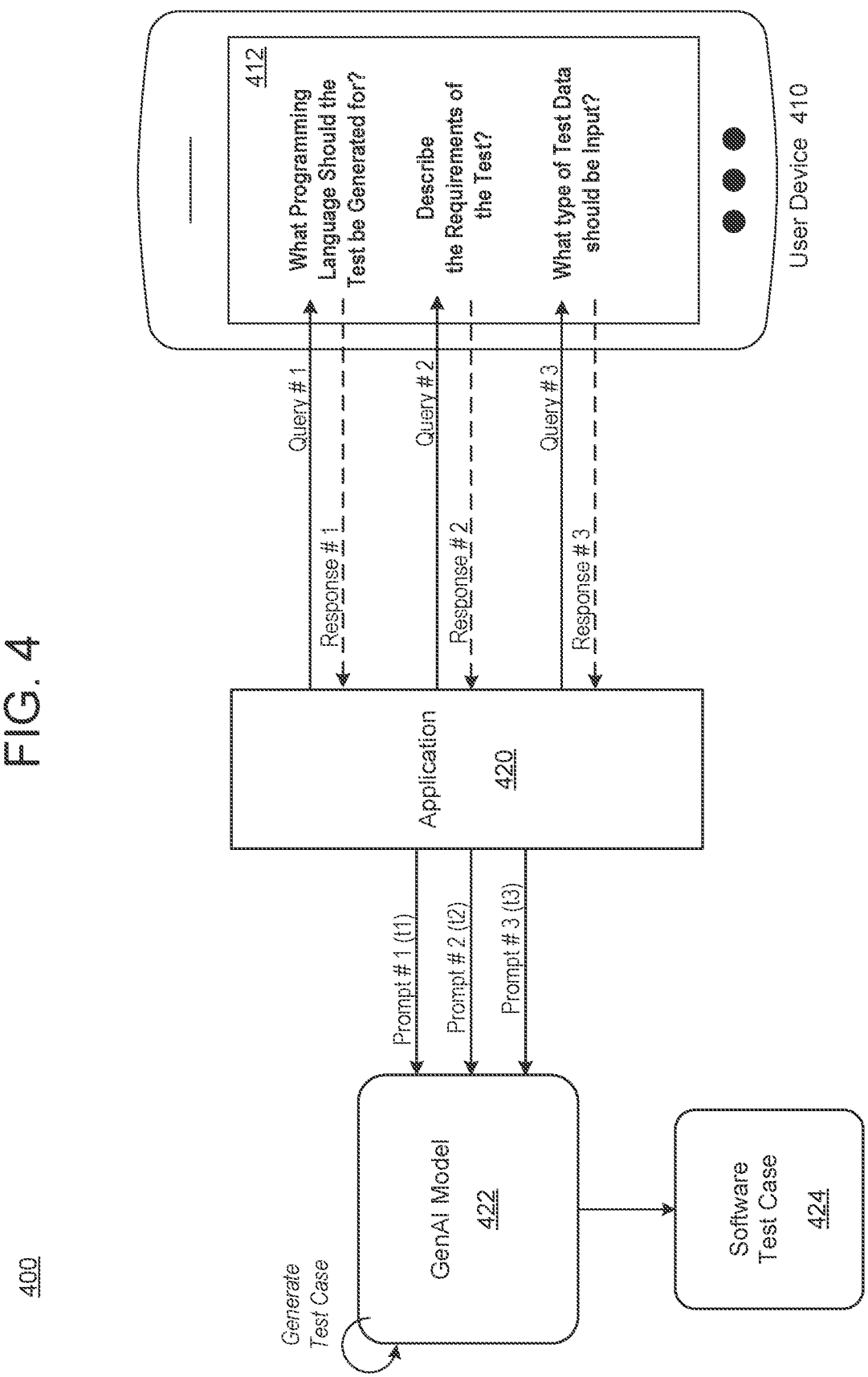
FIG. 4 is a diagram illustrating a process of prompting a GenAI model to generate an architecture diagram according to example embodiments.

FIG. 4 illustrates a process 400 of a GenAI model 422 generating an architecture diagram 424 of a software architecture based on prompts and responses to the prompts according to example embodiments.

Referring to FIG. 4, the GenAI model 422 may be hosted by a host platform and may be part of a software application 420 that is also hosted on the host platform. Here, the software application 420 may establish a connection with a user device 410, such as a secure network connection. The secure connection may include a PIN, biometric scan, password, username, TTL handshake, etc.

In the example of FIG. 4, the software application 420 may control the interaction of the GenAI model 422 on the host platform and the user device 410. In this example, the software application 420 may output queries on a user interface 412 of the user device 410 with user information requests. The user may enter values into the fields on the user interface corresponding to the queries and submit/transfer the data to the software application 420, for example, by pressing a submit button, etc. In this example, the application may combine the query with the response from the user interface and generate a prompt submitted to the GenAI model 422. For example, each prompt may include a combination of a query on the UI plus the response from the user. For example, if the query is "Describe the Requirements of the Test" and the response is "The test should check to make sure that the 16-digit input field on the GUI can only accept 16 digits", then the text from both the prompt and the response to the prompt may be submitted to the GenAI model 422.

In some embodiments, the software application 420 may deliberately add waiting times between submitting prompts to the GenAI model 422 to ensure the model has enough time to "think" about the answer. The waiting times may be integrated into the code of the software application 420, or they may be modified/configured via a user interface. Furthermore, the ordering of the prompts and the follow-up questions may differ depending on the answers given during the previous prompt or prompts. The content within the prompts and the ordering of the prompts can cause the GenAI model 422 to generate software tests, automation scripts, source code, or the like.

Figure 5A:
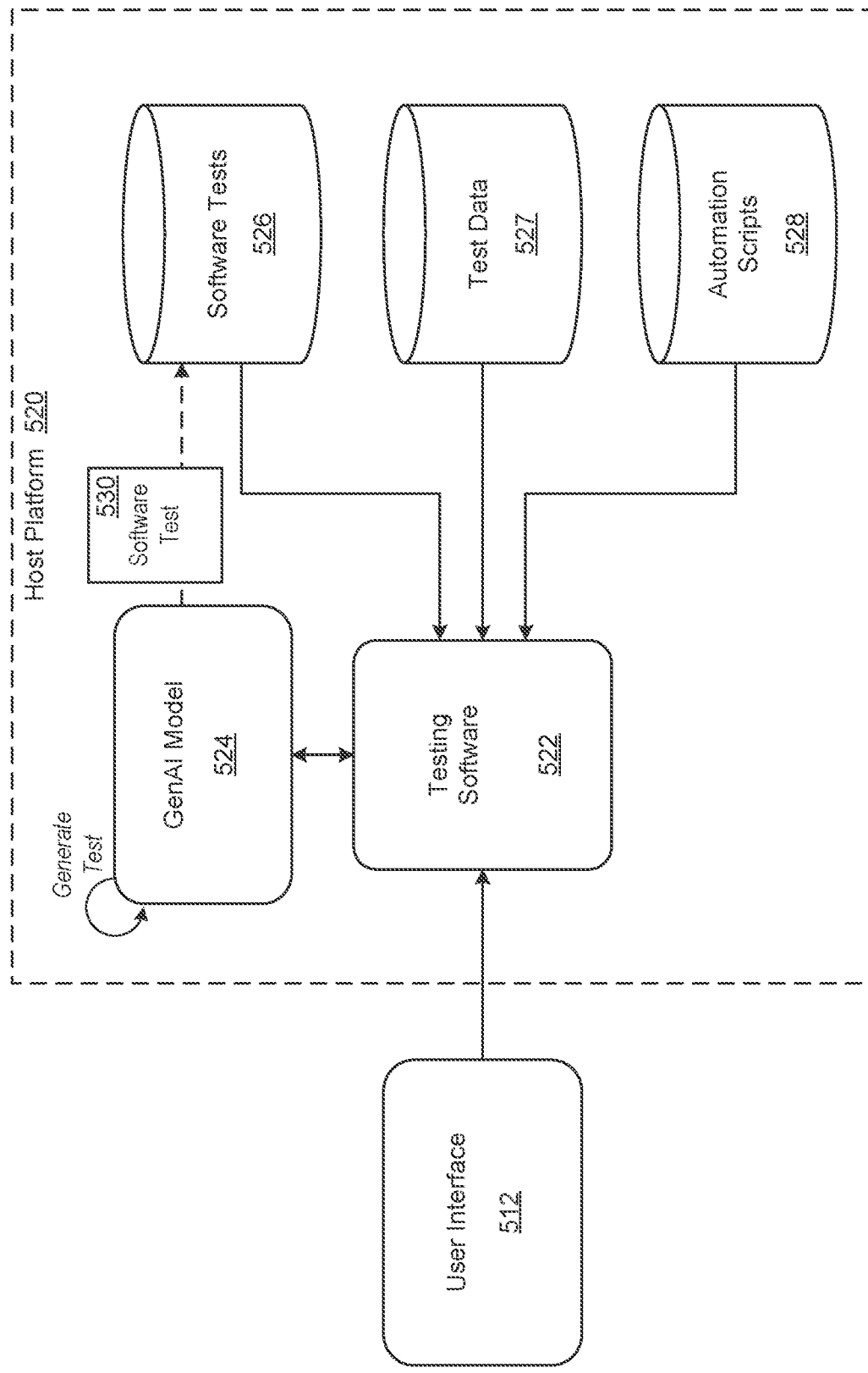

FIGS. 5A-5D illustrate a process of generating a software test according to example embodiments. For example, the process may be performed by the host platform 520, shown in the example of FIG. 1A, but the embodiments are not limited to it. For example, FIG. 5A illustrates a computing environment 500 of a host platform 520 that generates a software test 530 based on text data input via a user interface 512.

In this example, the host platform 520 hosts a testing software 522 that a user can interact with via the user interface 512. Here, the host platform 520 may include a web server, cloud platform, on-premises server, or the like, while the user interface 512 may be displayed on a screen of a user device such as a mobile device, laptop, tablet, or the like, which is network-connected to the host platform 620.

In this example, the testing software 522 includes various data stores that can be accessed when testing software programs. For example, a software test repository 526 may store software tests and related documentation, including best practices.

As another example, a test data database 527 may store test data that can be used by the software tests stored within the software test repository 526 during testing. In addition, the host platform 520 also includes a script database 528 that stores automation scripts that enable the software tests to be performed/executed in an automated manner.

According to various embodiments, the host platform 520 also hosts a generative artificial intelligence (GenAI) model 524 capable of generating a software test based on inputs received via the user interface 512. For example, the GenAI model 524 may be trained on a large corpus of software tests and software test documentation and can receive a description of a software test, such as the requirements of the test, and generate a software test document (e.g., the software test 530) that includes a set of instructions to be performed, expected results, and content areas that can be left blank for insertion by the user during testing. An example of the software test 530 is shown in FIG. 1B, however, embodiments are not limited to it. It should be appreciated that the software test may have a different format, a different style, images, and the like.

FIG. 5B illustrates a process 540 of generating a sequence of steps based on generative AI according to example embodiments. Referring to FIG. 5B, in this example, a user may submit a list of requirements or features of the software program that the user wishes to test.

The requirements may include a list of software functions, components, etc., that are to be tested and a description of the activities to be performed to carry out the test and what should happen when the activities are carried out.

For example, the requirements entered by the user may be the requirement mentioned already: "The test should check to make sure that the 16-digit input field on the GUI can only accept 16 digits." In response, the GenAI model 524 may generate a sequence of steps, including step 542, a step 544, a step 546, and a step 548. Here, the steps may be determined by the GenAI model 524 based on historical software tests that have had similar requirements that the GenAI model has learned from. In this example, the steps, including the step 542, the step 544, the step 546, and the step 548, are displayed on the user interface 512, where the user of the user device can view the steps and provide feedback or accept the steps. Each step is another step during the test of the software program.

For example, FIG. 5C illustrates a process 550 of generating a new software test from the steps shown on the user interface in FIG. 5B. Referring to FIG. 5C, a user may press a submit button 549 on the user interface 512 or otherwise accept the steps shown on the user interface for inclusion in a software test. In response, the system described herein inputs the steps on the user interface 512 into a new software test 552, which includes the steps shown on the user interface, including the step 542, the step 544, the step 546, and the step 548, as well as the order in which the sequence of steps are in. For example, the host platform 520 may generate a document, an XML file, a JSON, etc., describing the steps.

In some embodiments, the GenAI model 524 may generate other attributes associated with the new software test 552, including an activation script for executing the new software test 552 in an automated manner, a description/label for the new software test 552, and the like. An example of generating an automation script is further described in the examples of FIGS. 6A-6C. Referring again to FIG. 5C, the new software test 552 may include a description 554 of the overall theme or purpose of the test, which is also generated by the GenAI model 524 and added/appended to the new software test 552 as a label. The description 554 can be searched by a search engine or other software program when searching for software tests to perform.

Here, the host system may store the new software test 552 paired with the description 554 in the software test repository 526.

Figure 5D:
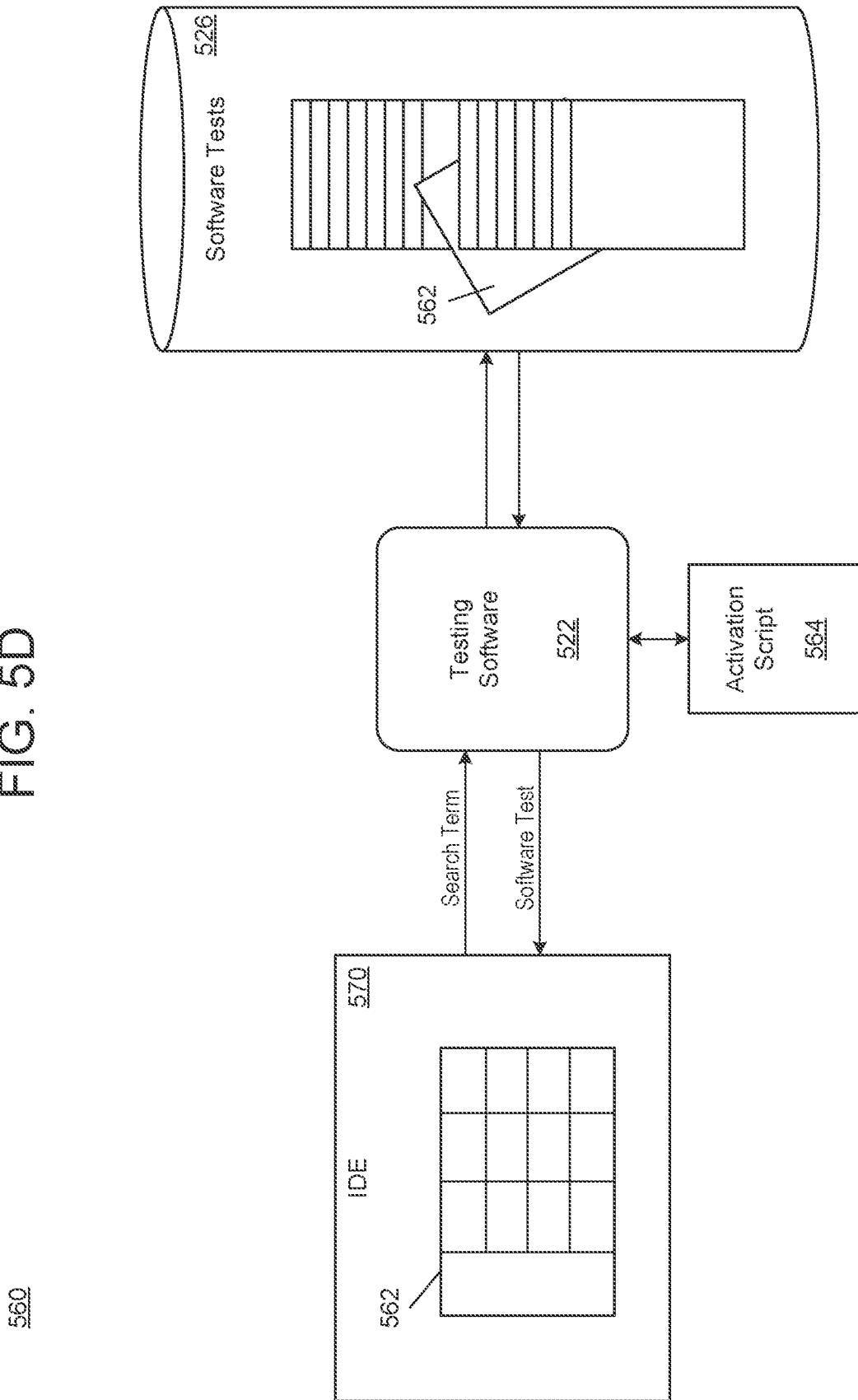

FIG. 5D illustrates a process 560 of executing the new software test 552 and showing the software test via an image 562 on a user interface 570 of a software application such as an integrated development environment (IDE).

As noted, the description 554 added to the new software test 552 may be used to search the software test repository 526 for and select a software test based on a search term input from the user interface 570. Each software test stored in the software test repository 526 may include a label/description with keywords associated with the test that can be searched by the testing software 522. Furthermore, the testing software 522 may launch/execute a software program to be tested and also launch an automation script 564, which automates the execution of the software test on the software program. The results may be displayed via the user interface 570.

Figure 6A:
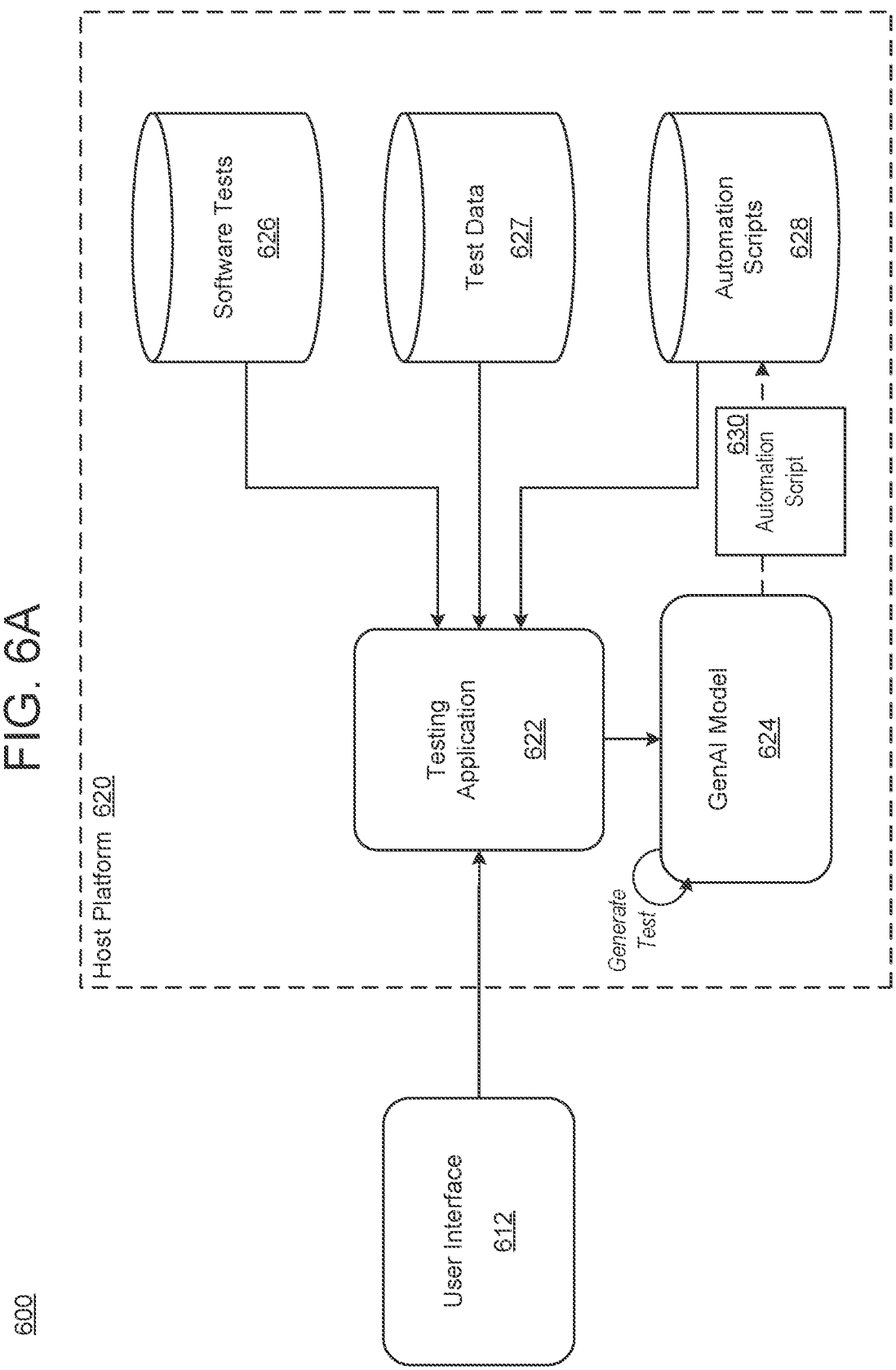
FIGS. 6A-6C are diagrams illustrating a process of generating an automation test script according to example embodiments.
Figure 6B:
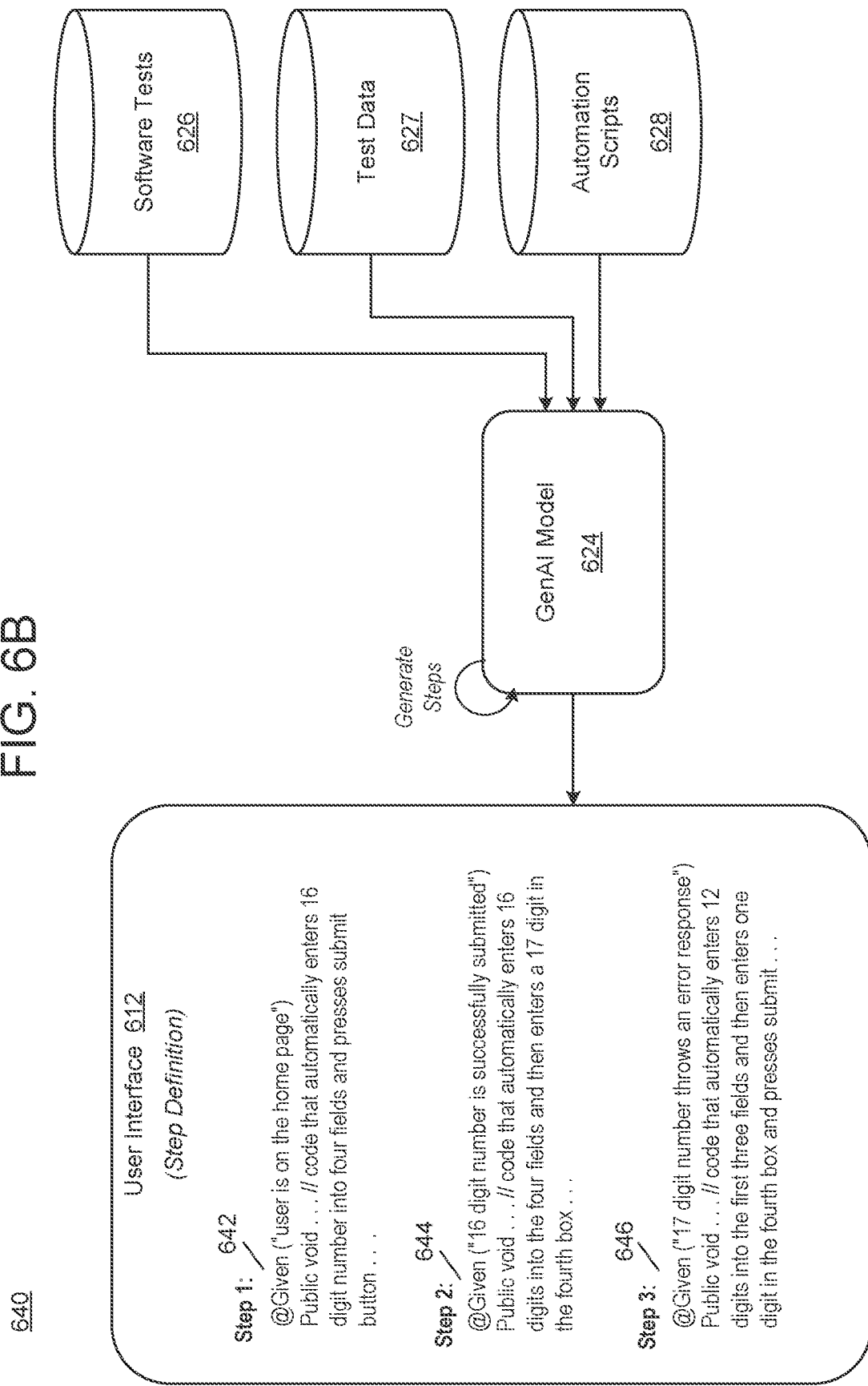
Figure 6C:
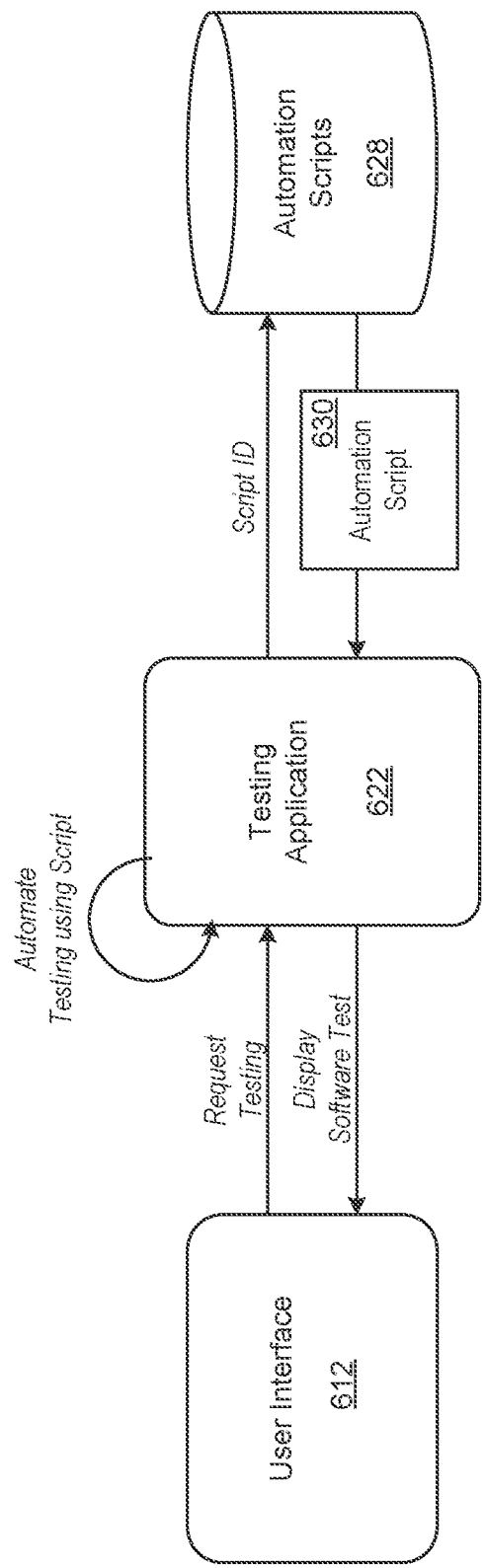

FIGS. 6A-6C are diagrams illustrating a process of generating an automation test script according to example embodiments.

For example, FIG. 6A illustrates a computing environment 600 for generating an automation script 630 for automating the execution of a software test (not shown), such as the software test 530 in FIG. 5A, or the like. In this example, the process may be performed by a host platform 620 that is the same as or similar to the host platform 520 shown in FIG. 5A, but the embodiments are not limited to it. For example, FIG. 6A illustrates a computing environment 600 of a host platform 620 that generates an automation script 630 based on text data input via a user interface 612. In this example, the host platform 620 hosts a testing software 622 that a user can interact with via the user interface 612. The host platform 620 may include a web server, cloud platform, on-premises server, or the like, while the user interface 612 may be displayed on a screen of a user device such as a mobile device, laptop, tablet, or the like, which is network-connected to the host platform 620.

According to various embodiments, the host platform 620 also hosts a generative artificial intelligence (GenAI) model 624 capable of generating an automation script for automating the execution of a software test based on inputs received via the user interface 612. For example, the GenAI model 624 may be trained on a large corpus of automation scripts, software tests, scripting best practices, and the like, and can receive a description of a software test, such as the requirements of the test, and generate a list of features to be performed by the software test.

The list of features or steps may be used to build an automation script for executing the software test with little or no user involvement.

In this example, the GenAI model 624 may ingest training materials from a repository of software test s 626, a database of test data 627, a repository of automation scripts 628, or the like, as well as the requirements input by the user on the user interface 612.

The model may use these inputs to build a step definition. For example, FIG. 6B illustrates a process 640 of generating a step file with a list of steps (also called a step definition). Here, the GenAI model 624 may generate a step 642, a step 644, and a step 646, which are to be performed by the script, and code to be executed by the script to carry out the step.

In the example of FIG. 6B, pseudo-code is shown, but it should be appreciated that actual source code may be stored within the step definition.

According to various embodiments, the sequence of steps (step definition) may include mappings between each step/scenario within the software test and the code function to be executed by the script. The step definition can be thought of as the automation script. It can be encoded and executed by a computer processor. When the testing software executes the step definition, it scans the step definition and identifies which function to call/execute based thereon.

FIG. 6C illustrates a process 650 of executing a software test via the testing software 622 based on the automation script 630 generated in FIG. 6A.

Here, the testing software 622 reads the step definition from the automation script, held in the repository of automation scripts 628. The testing software 622 can map the next step to be performed within the software test to the corresponding code module in the automation script and identify the code function(s) to execute and executes it. This process continues for each activity in the software test, paired with a step in the automation script. Thus, the order/sequence of steps can be maintained.

Figure 7B:
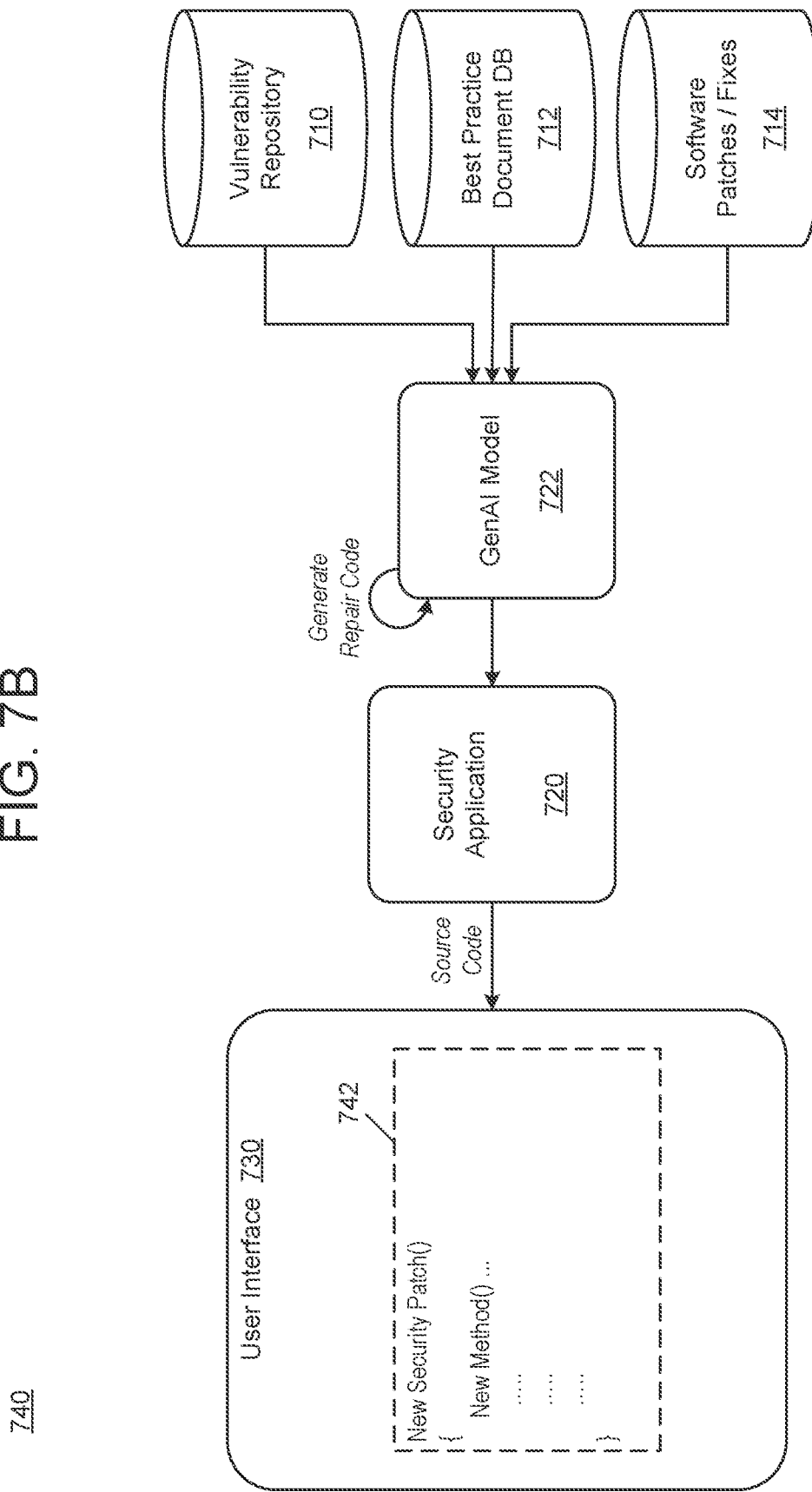
Figure 7C:
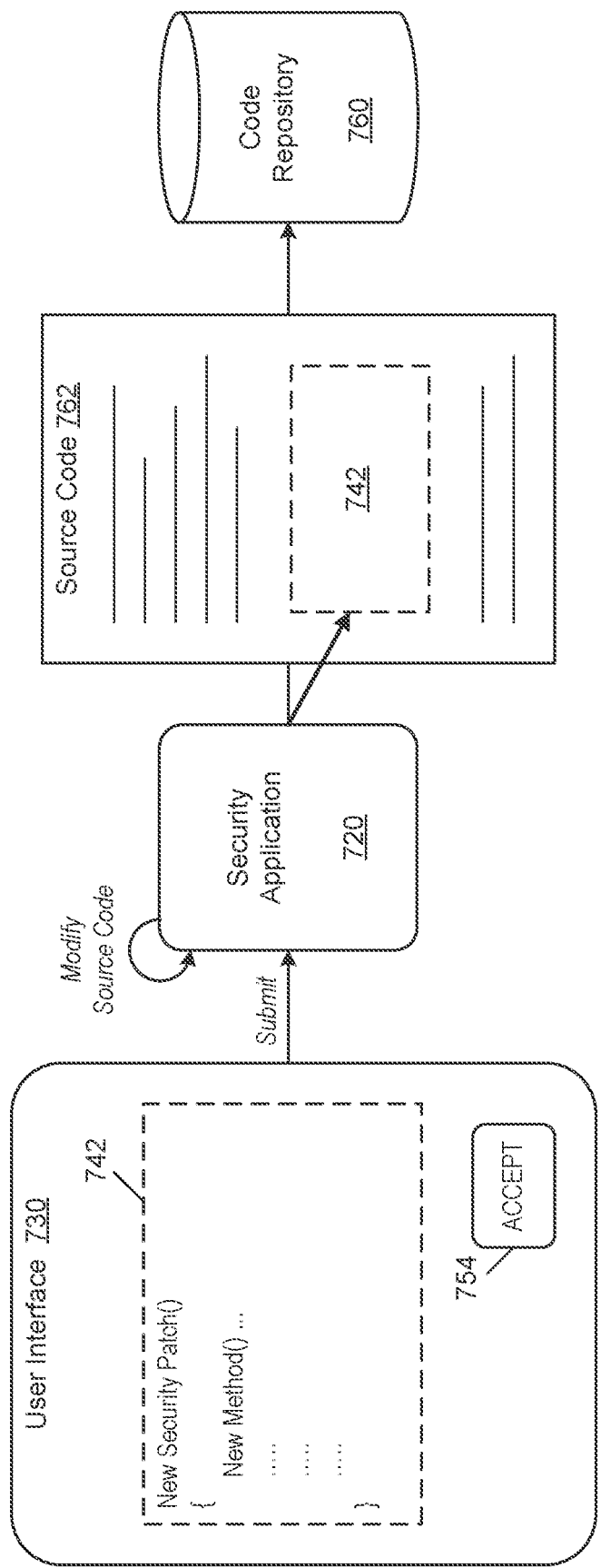

FIGS. 7A-7C illustrate a process of identifying and testing a software vulnerability according to example embodiments. For example, FIG. 7A illustrates a process 700 of a user being prompted about an issue they are experiencing with a software program. For example, the software program may be a software program being tested via the testing software 622 shown in FIG. 6A or the testing software 522 shown in FIG. 5A.

Referring to FIG. 7A, the user may be using a security application 720 hosted by a host platform (not shown).

The security application 720 may have a user interface 730 that is accessible and displayed on a screen of a user device (not shown) that is network-connected to the host. The security application 720 also includes a GenAI model 722 trained to generate source code.

In the example of FIG. 7A, the GenAI model 722 may receive a request from the user with a software error notification.

In response, the GenAI model 722 may prompt the user with various prompts 732 and 736 and receive a response from fields 734 and 738 on the user interface 730. The combination of the prompts and the responses extracted from the fields 734 and 738 may be input into the GenAI model 722. The inputs can be used by the GenAI model 722 to determine a security vulnerability with the software program being tested.

According to various embodiments, the GenAI model 722 may generate source code based on the determined security vulnerability.

For example, the GenAI model 722 may consume source code of known vulnerabilities from a code repository 710, best practices documentation from a database 712, a database of software patches/fixes 714, which includes a description of the problems and the source code used to repair the problems. The GenAI model 722 may learn from and use the code and best practice recommendations to generate new source code, as shown in the example of FIG. 7B.

In particular, FIG. 7B illustrates a process 740 of generating new source code 742 and displaying it on a screen (e.g., the user interface 730). For example, the GenAI model 722 may consume source code and/or best practice documentation during runtime or during training and use the knowledge therein to generate new source code. In this example, the new source code 742 includes a repair, patch, fix, etc., for the security vulnerability detected by the GenAI model 722 in FIG. 7B. The source code may include methods, functions, calls, etc. The user may be allowed to accept the code or reject the code.

For example, FIG. 7C illustrates a process 750 of the new source code 742 being inserted into source code 762 of the software program. Referring to FIG. 7C, the user may accept the repair code by pressing an accept button 754 or the like on the user interface 730. In response, the security application 720 may identify a location for the new source code 742 within the source code 762, insert it therein, and store the source code 762 with its updates/modifications in a code repository 760 of the host platform.

Figure 8A:
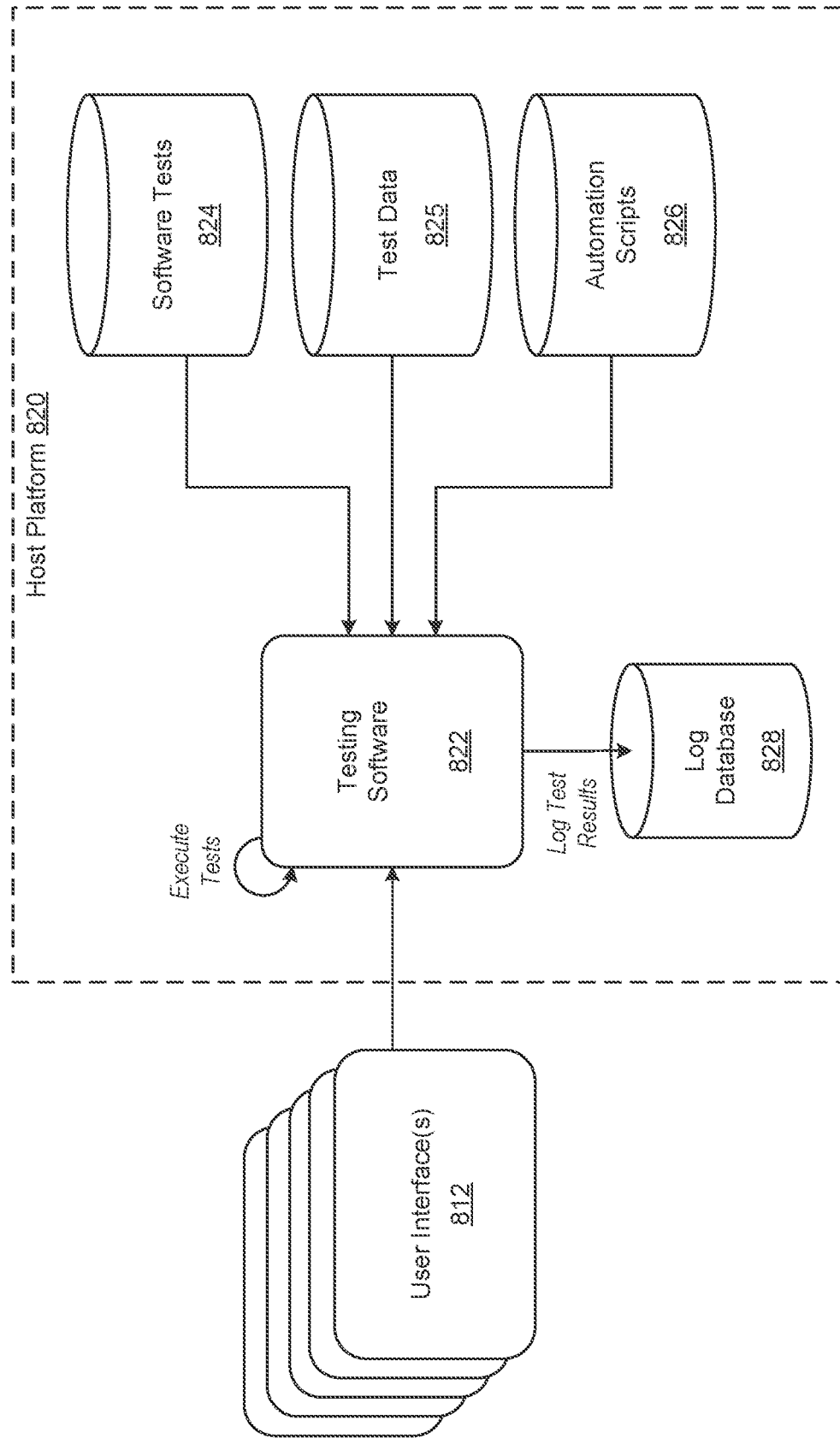
FIGS. 8A-8C are diagrams illustrating a process of generating new features for a software application based on software testing according to example embodiments.
Figure 8B:
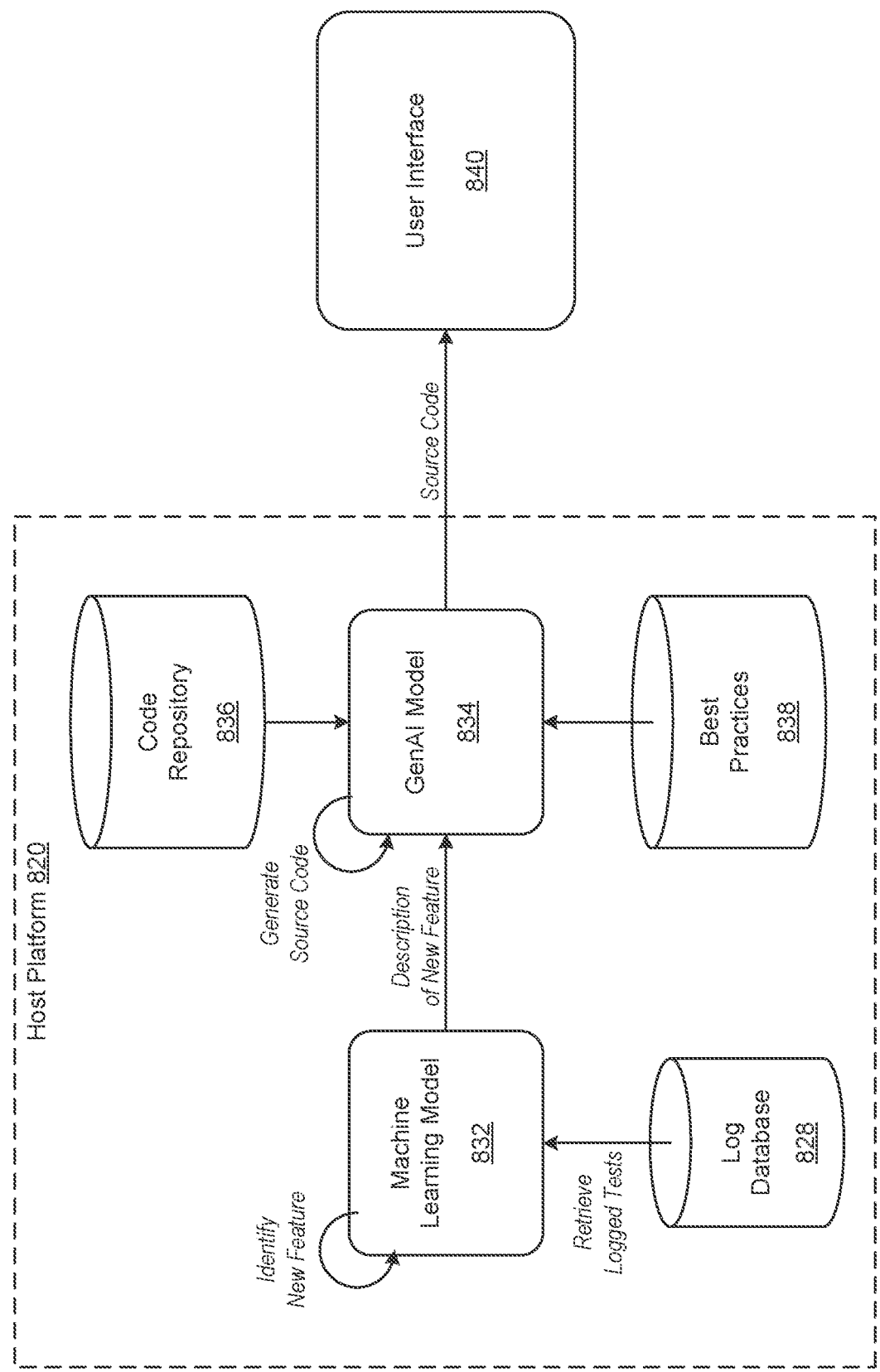
Figure 8C:
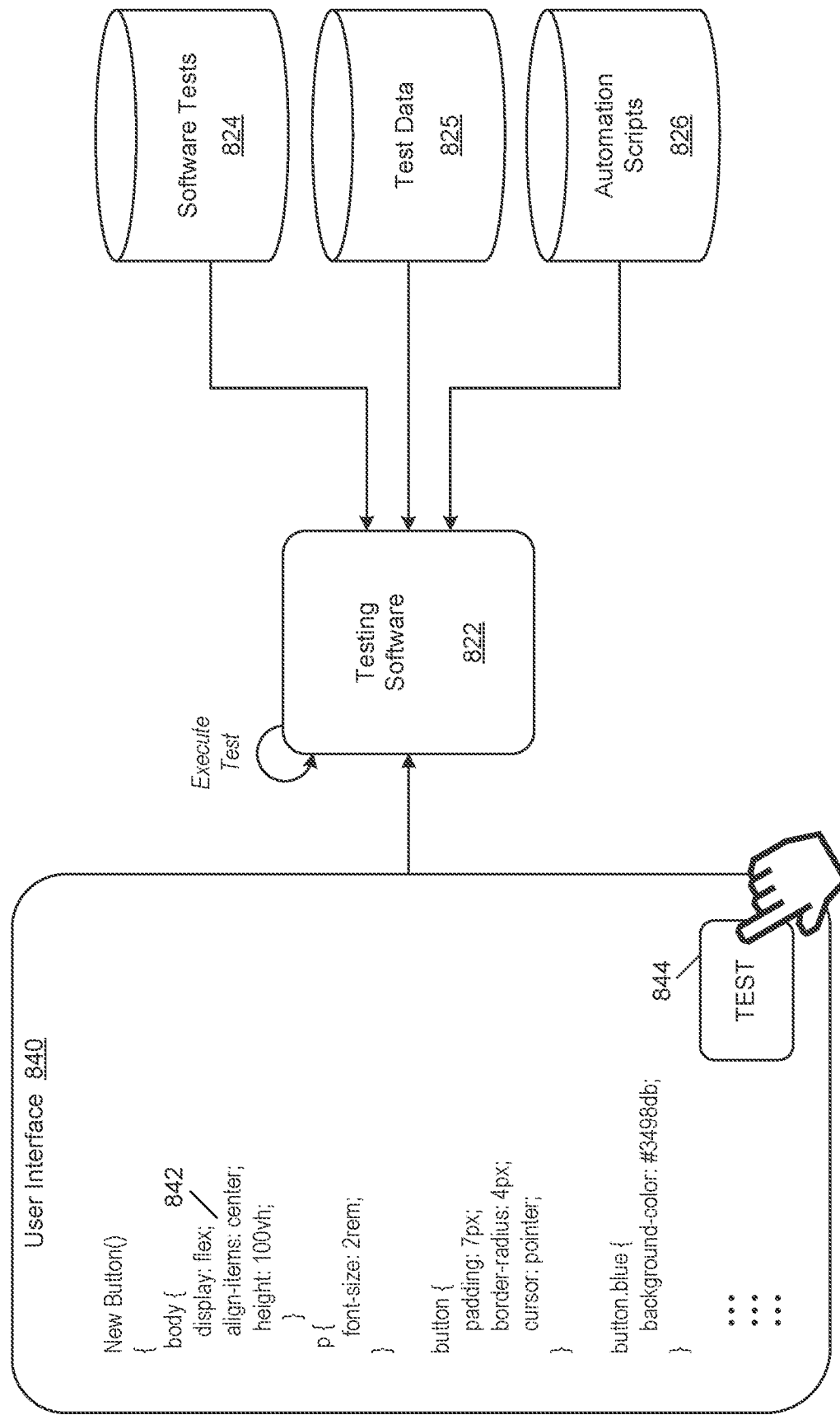

FIGS. 8A-8C illustrate a process of generating new features for a software application based on software testing according to example embodiments. For example, FIG. 8A illustrates a process 800 of multiple users testing software via a common software application (testing software) hosted on a host platform 820. According to various embodiments, multiple users may access and use the testing software 822 shown in FIG. 8A. During this process, the users may run tests via user interfaces 812 on different aspects of a software application or multiple software applications.

For example, software tests may be retrieved from a test case repository 824, and test data for the software tests may be retrieved from a test data database 825. Furthermore, an automation script may be retrieved from a script repository 826 to execute the software tests in an automated manner.

During the testing processes, the testing software 822 may log the testing results into a log database 828, including the tests performed, the outputs, the pass/fail status, and the like. This data contains valuable information that can be used to develop new features about the software being tested. For example, the log data stored in the log database 828 may contain information about the software's features being tested and the frequency at which the features are being tested. Features being tested more frequently may be ideal for replacement.

According to various embodiments, a GenAI model may suggest new features or replacement features for a software application based on the logged testing data. For example, FIG. 8B illustrates a process 830 of a machine learning model 832 receiving the logged data from the log database 828, which is from testing a particular software program via the testing software 822 shown in FIG. 8A.

The logged data may be input to a machine learning model 832, which is trained to identify new features for a software application, such as new buttons or controls on the user interface, new methods, new APIs, new code modules, etc.

In this example, the machine learning model 832 may include a language model or a large language model that can receive text from the log database 828 and identify a new feature to be added.

Also, the description of the new feature may be output by the machine learning model 832 and input to a GenAI model 834. Here, the GenAI model 834 may receive the description of the new feature and generate source code for adding the new feature to the software program. The source code may be generated based on source code examples stored in a code repository 836 and best practice documentation stored in a database 838. Here, the resulting source code generated by the GenAI model 834 may be displayed on a user interface 840, which may be viewed on a user device. For example, the new source code may include source code 842, shown on the user interface 840 in FIG. 8C.

FIG. 8C illustrates a process 850 of testing the source code 842 generated by the GenAI model 834 and displayed on the user interface 840. Here, a user may press a "test" button 844 on the user interface 840 or the like, which causes the testing software 822 to execute a software test on the source code 842. In some embodiments, the user may choose the software test, which the GenAI model may automatically generate or select. Here, the testing software 822 may use software tests stored in the test case repository 824, test data stored in the test case database 825, and/or an automation script included in the script repository 826.

Figure 9A:
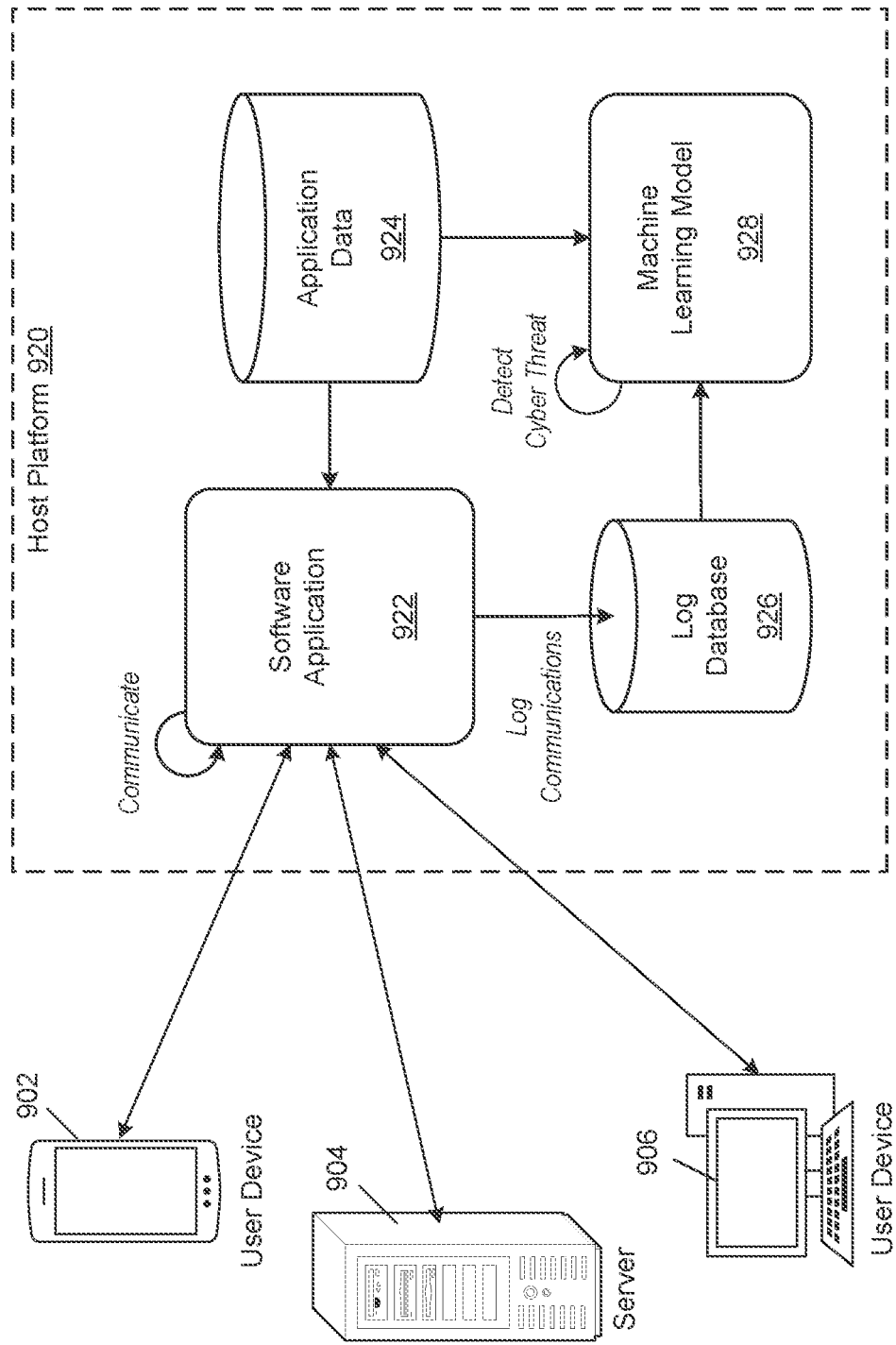

FIGS. 9A-9B illustrate a process of detecting and simulating the security threat on a computer network according to example embodiments. For example, FIG. 9A illustrates a process 900 of a plurality of user devices, including user device 902, user device 904, and user device 906, accessing a software application 922 hosted on a host platform 920. Here, the users may access the software application 922 to access user accounts and other data held in an application database 924.

In this example, the user devices may communicate with the software application 922 over a computer network such as the Internet, subject to security issues. For example, the user devices may download data, upload data, send network communications, and the like over a public network. During this time, the communications between the user devices and the host platform 920 may be monitored and stored within a log database 926 within the runtime environment. In this example, the log may describe the communications, requests, responses, client-server interactions, and the like.

According to various embodiments, a machine learning model 928 may be executed on the communication history data stored in log data stored in the log database 926 to identify a potential threat to the network on which the host platform 920 operates. The potential threat may include a virus, phishing, brute force, or other cyber threats. In this example, the machine learning model 928 can identify the potential threat and notify a GenAI model 932, as shown in FIG. 9B.

For example, FIG. 9B illustrates a process 930 of installing the potential security threat in a system, such as a digital twin, associated with the host platform. Referring to FIG. 9B, the GenAI model 932 may receive an identifier of the potential threat and generate source code 936 that mimics the threat.

For example, the GenAI model 932 may access a source code repository and use that to generate the potential threat.

Furthermore, the host platform 920 may launch a digital twin 934 of the host platform, the computer network, a particular device, or a combination of devices and install the source code 936 for the security threat.

This process may be performed via a security software program 940 on the host platform 920, which executes a simulation of the security threat on the digital twin 934. The digital twin 934 may be generated ahead of time and may be ready for the source code 936.

Figure 10A:
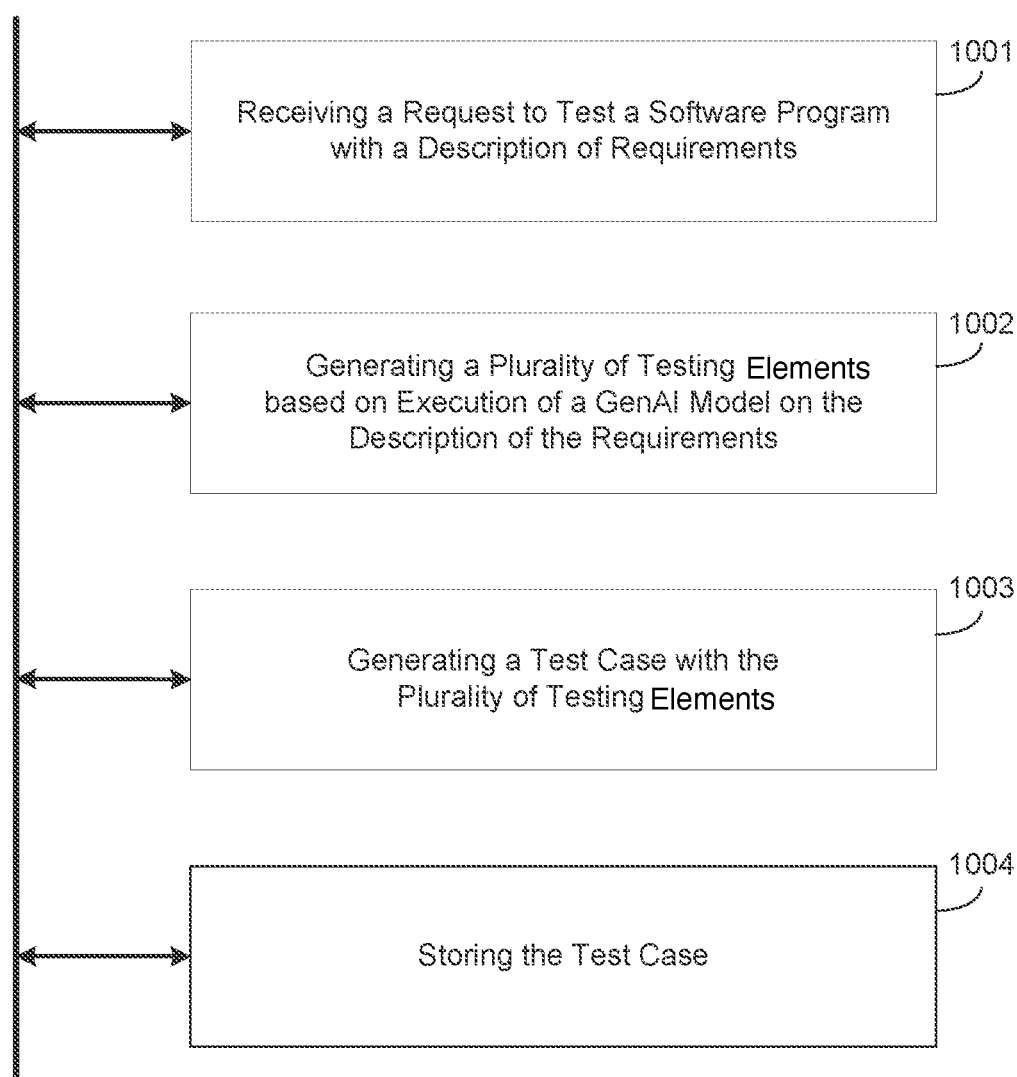
FIG. 10A is a diagram illustrating a method of generating a software test case using GenAI according to example embodiments.

FIG. 10A is a diagram illustrating a method of generating a software test case using GenAI according to example embodiments. For example, the method 1000 may be performed by a host platform such as a web server, cloud platform, on-premises server, or the like.

Referring to FIG. 10A, in 1001, the method may include receiving a request to test a software program from a user device, the request comprising a description of requirements of the software program. In 1002, the method may include generating a plurality of testing elements based on the execution of a generative artificial intelligence (GenAI) model on the description of the requirements of the software program and a repository of test cases. In 1003, the method may include generating a test case for testing the software program where the test case comprises the plurality of testing elements generated by the GenAI model. In 1004, the method may include storing the test case within a storage device.

In some embodiments, the method may further include displaying the plurality of testing elements via a user interface, receiving approval of the plurality of testing elements via the user interface, and, in response to the received approval, generating the test case comprising the plurality of testing elements. In some embodiments, the method may include generating and outputting a prompt on a user interface of the user device and receiving a response to the prompt from the user interface. In some embodiments, the method may include generating the plurality of testing elements for the test case based on the execution of the GenAI model on the prompt and the response to the prompt.

In some embodiments, the generating the plurality of test steps may include generating a description of a plurality of actions to be performed by a user during the performance of the test case, and generating the test case comprises storing the description of the plurality of actions within a document. In some embodiments, the test case may include perquisites, an objective, references, and test steps generated by the GenAI model based on the execution of the GenAI model on the descriptions of the requirements of the software program and the repository of test cases. In some embodiments, the method may further include displaying the test case generated by the GenAI model on the user interface and receiving feedback about the test case via the user interface. In some embodiments, the method may further include training the GenAI model based on execution of the GenAI model on the test case and the received feedback about the test case.

FIG. 10B is a diagram illustrating a method of generating an automation script for executing a software test according to example embodiments. For example, the method 1010 may be performed by a host platform such as a web server, cloud platform, on-premises server, or the like. Referring to FIG. 10B, in 1011, the method may include receiving a description of a plurality of testing elements for testing a software program and storing the software test within a storage device. In 1012, the method may include generating an automation script for automating execution of the software test based on execution of a generative artificial intelligence model (GenAI) model on the plurality of testing elements and a repository of automation scripts. In 1013, the method may include attaching the automation script to the software test within the storage device. In response to a request to execute the software test, in 1014, the method may include executing the plurality of testing elements within the software test based on the attached automation script.

In some embodiments, the method may further include displaying results of the execution of the plurality of testing elements via a user interface. In some embodiments, the method may include generating a description of a plurality of features to be included within the software test based on the received requirement and generating the automation script based on the execution of the GenAI model on the plurality of features. In some embodiments, the method may include generating a step definition based on the requirement generated in a predefined programming language.

In some embodiments, the generating may include generating the automation script in the predefined programming language based on the step definition. In some embodiments, the method may further include training the GenAI model to understand connections between features and source code by executing the GenAI model on mappings between a plurality of features and a plurality of code modules, respectively. In some embodiments, the automation script may include generating an executable software program that executes the plurality of testing elements in sequence via a software application's user interface. In some embodiments, the request may include an identifier of a programming language, and the executing comprises executing the software test via a framework developed in the identified programming language.

FIG. 10C is a diagram illustrating a method of training a large language model to understand software test cases and automation scripts according to example embodiments. For example, the method 1020 may be performed by a host platform such as a web server, cloud platform, on-premises server, or the like. Referring to FIG. 10C, in 1021, the method may include generating a large language model via a user interface. In 1022, the method may include executing the large language model on a repository of software test cases and requirements of the software test cases to train the large language model to understand connections between test case components and test case requirements. In 1023, the method may include receiving a description of the features of a software program to be tested. In 1024, the method may include, in response to receiving the description of the features, generating a software test case based on the execution of the large language model on the received descriptions and displaying the software test case via the user interface.

In some embodiments, the method may include receiving user feedback about the software test case via the user interface and executing the large language model on the software test case and the feedback to further train the large language model. In some embodiments, the method may further include receiving a call via an application programming interface (API) with an identifier of a programming language and, in response, generating the software test case for the software program within the identified programming language. In some embodiments, the executing may further include executing the large language model on best practices documents of software test cases to further train the large language model to understand best practices.

In some embodiments, the method may include generating and outputting a prompt on the user interface during the training and receiving a response via the user interface. In some embodiments, the executing may include training the large language model based on the prompt output on the user interface and the response to the prompt received via the user interface. In some embodiments, the generating may include generating a plurality of test components of the software test, including a test specification, a test execution, a test recording, and a test verification based on the execution of the GenAI model. In some embodiments, the generating may include generating a respective requirement for each component within the software test based on the execution of the large language model on the received descriptions.

Figure 10D:
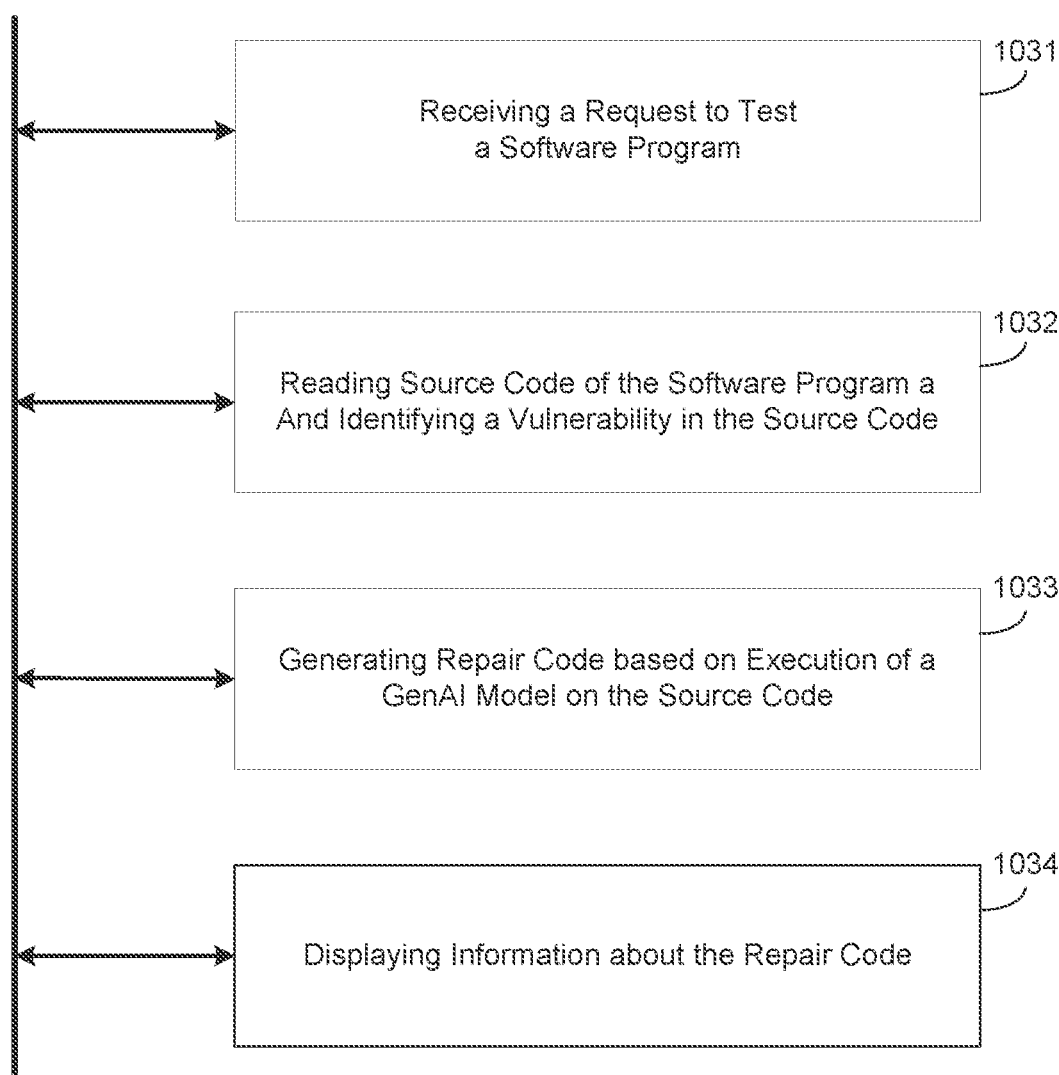
FIG. 10D is a diagram illustrating a method of identifying a vulnerability in a software program and generating a fix for the vulnerability according to example embodiments.

FIG. 10D illustrates a method 1030 of identifying a vulnerability in a software program and generating a fix for the vulnerability according to example embodiments. For example, the method 1030 may be performed by a host platform such as a web server, cloud platform, on-premises server, or the like. Referring to FIG. 10D, in 1031, the method may include receiving, via a user interface, a request to test a software program. In 1032, the method may include reading source code of the software program and identifying a vulnerability in the source code based on the reading. In 1033, the method may include generating repair code for fixing the identified vulnerability based on execution of a generative artificial intelligence (GenAI) model on the source code and a repository of repair code used to repair previous vulnerabilities. In 1034, the method may include displaying information about the repair code via the user interface.

In some embodiments, the method may include executing the GenAI model based on the source code and the repository of repair code to code for a new software component to address the vulnerability and display the generated source code of the new software component via the user interface. In some embodiments, the method may include receiving an input via the user interface with a confirmation of the repair code and, in response, inserting the repair code into the software program's source code. In some embodiments, the method may include generating one or more prompts based on the execution of the GenAI model on the source code and the repository of repair code and displaying the one or more prompts via the user interface.

In some embodiments, the method may include receiving a natural language response to the one or more prompts and generating the repair code based on execution of the GenAI model on the one or more prompts and the natural language response. In some embodiments, the software vulnerability may include one or more of a missing software component, an incorrect software component, and a malicious software component. In some embodiments, the generating may include modifying an existing software component of the software program as the repair code based on the execution of the GenAI model on the source code and the repository of repair code. In some embodiments, the method may include generating source code for changing the existing software component of the software program based on the execution of the GenAI model on a repository of software fixes.

Figure 10E:
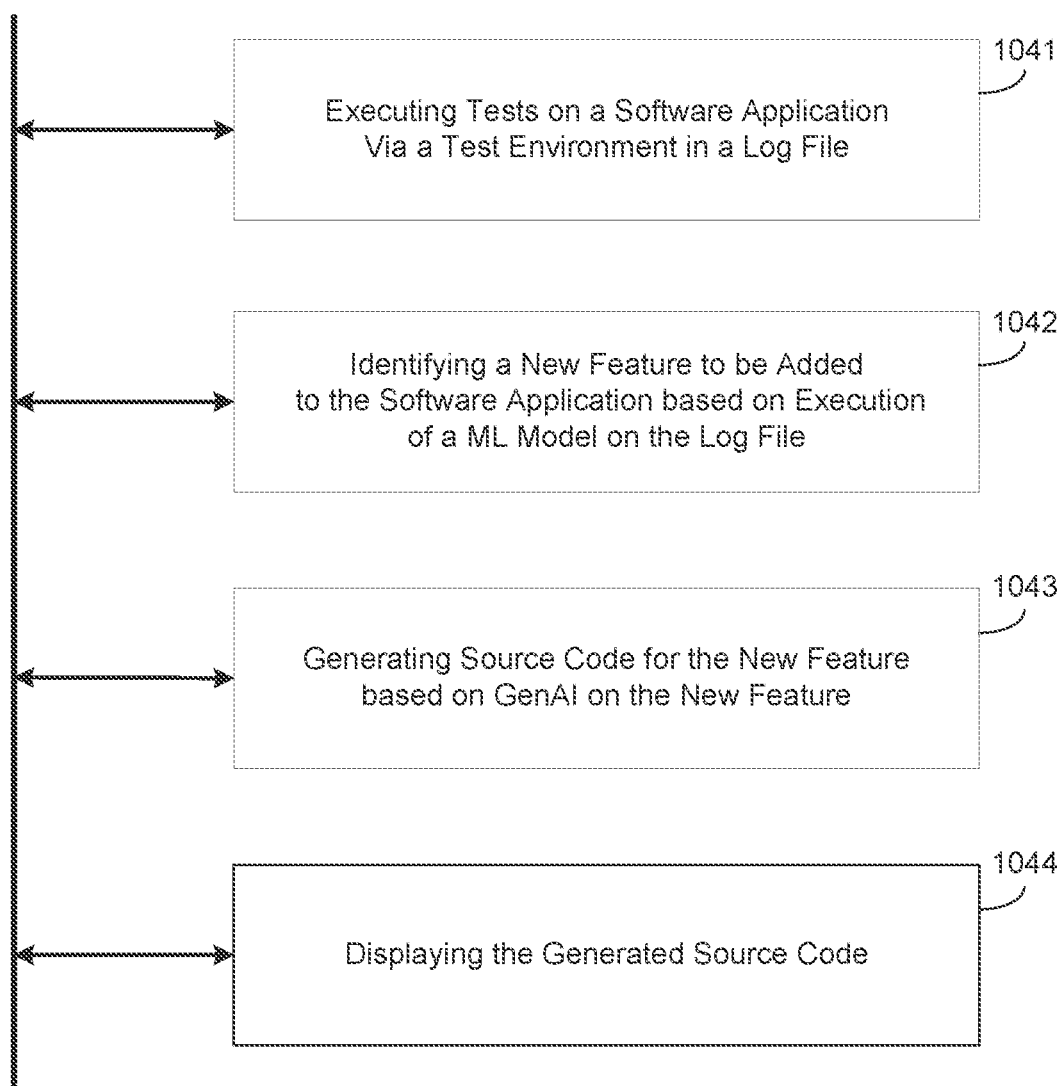
FIG. 10E is a diagram illustrating a method of identifying a new feature and generating source code for the new feature according to example embodiments.

FIG. 10E illustrates a method 1040 of identifying a new feature and generating source code for the new feature according to example embodiments. For example, the method 1030 may be performed by a host platform such as a web server, cloud platform, on-premises server, or the like.

Referring to FIG. 10E, in 1041, the method may include executing tests on a software application via a test environment of a test platform and logging the results of the tests in a log file. In 1042, the method may include identifying a new feature to be added to the software application based on the execution of a machine learning model on logged results of the tests stored in the log file.

In 1043, the method may include generating source code for the new feature to be added to the software application based on the execution of a generative artificial intelligence (GenAI) model on the new feature and a repository of source code. In 1044, the method may include displaying the generated source code via a user interface of the software application.

In some embodiments, the method may include adding the generated source code for the new feature to the existing source code of the software application to generate an updated software application and storing the updated software application in a software repository. In some embodiments, the method may further include a description of the new features based on the execution of the GenAI model on the new feature and the repository of source code and storing the description with the generated source code in a file on a storage device. In some embodiments, the method may include executing the generated source code, executing one or more test cases to generate test results, and displaying the test results via the software application's user interface.

In some embodiments, the method may include generating the one or more test cases based on execution of the GenAI model on the generated source code and one or more repositories of sample test cases. In some embodiments, the identifying may include identifying a new input mechanism to be added to the software application's user interface based on the execution of the machine learning model, and the generating comprises generating source code for the new input mechanism on the user interface. In some embodiments, the executing the tests on the software application via the test environment may include executing tests on the software application simultaneously while identifying the new feature to be added. In some embodiments, the generating the source code may include modifying an existing code module of the software application to perform the new feature and displaying the modified code module via the user interface.

Figure 10F:
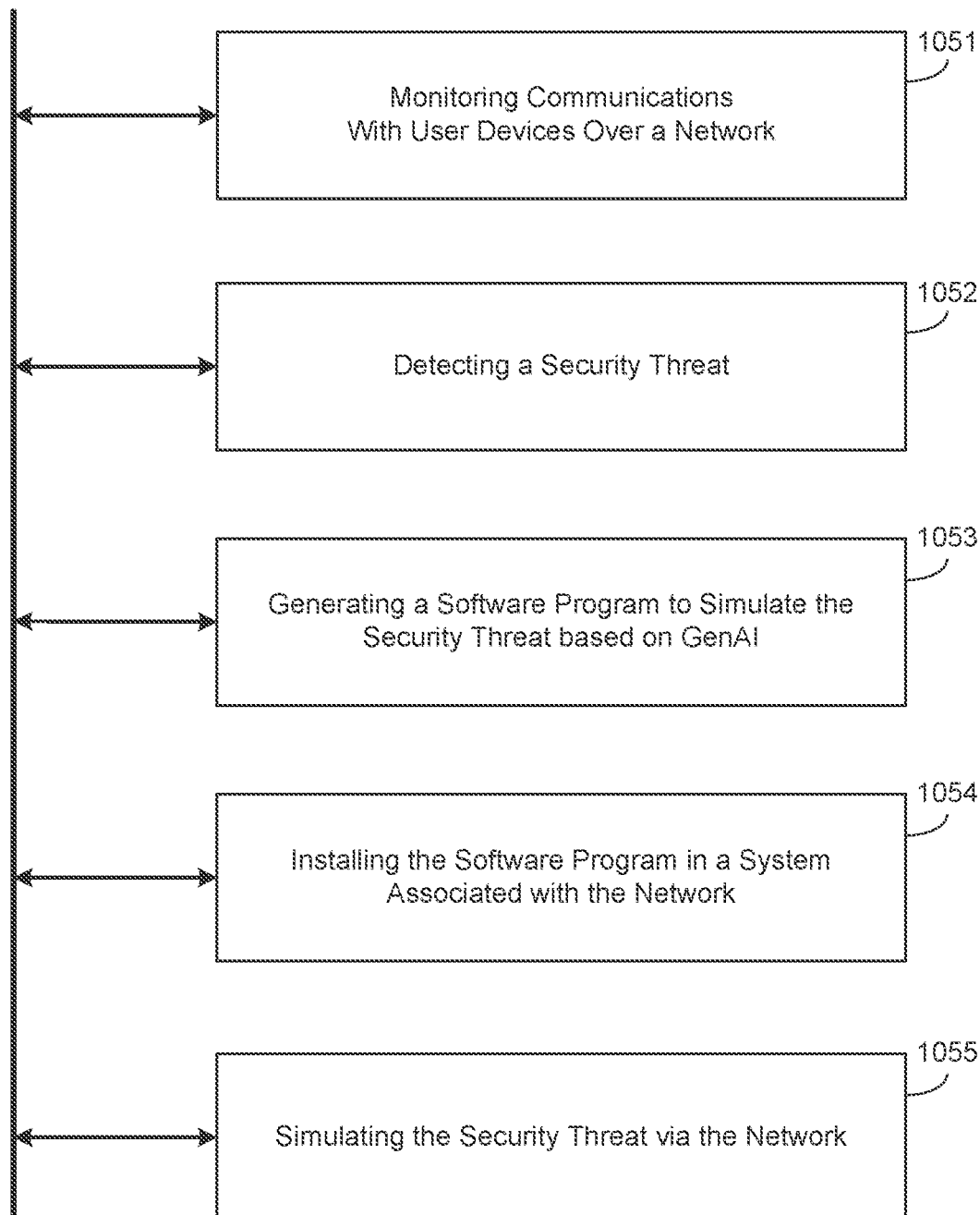
FIG. 10F is a diagram illustrating a method of detecting a security threat to a network and simulating intrusion of the security threat according to example embodiments.

FIG. 10F illustrates a method 1050 of detecting a security threat to a network and simulating intrusion of the security threat according to example embodiments. For example, the method 1050 may be performed by a host platform such as a web server, cloud platform, on-premises server, or the like. Referring to FIG. 10F, in 1051, the method may include monitoring communications with user devices over a shared computer network. In 1052, the method may include detecting a security threat from the monitored communications. In 1053, the method may include generating a software program to simulate the security threat over the shared computer network based on execution of a generative artificial intelligence (GenAI) model on a description of the security threat and a source code repository. In 1054, the method may include installing the source code for simulating the security threat on a system associated with the computer network. In 1055, the method may include executing the source code for simulating the security threat via the system.

In some embodiments, the method may include recording network communications between the user devices via a log and detecting the security threat based on execution of a machine learning model on the log. In some embodiments, the method may include generating the description for the security threat based on execution of the machine learning model on the log of the monitored communications. In some embodiments, the monitoring may include monitoring communications between the user devices and a software application hosted on a host platform, and the detecting comprises detecting a vulnerability in the software application hosted by the host platform based on responses from the software application to the user devices.

In some embodiments, the communications may include one or more of client-server communications, network payloads, and network traffic patterns that occur on the shared computer network. In some embodiments, the installing may include installing the source code for simulating the security threat within a digital twin of the shared computer network and executing the installed source code via the digital twin of the shared computer network. In some embodiments, the installing may include installing the source code for simulating the security threat within a system on a different computer network and executing the source code on the shared computer network via the system on the different computer network. In some embodiments, the method may include generating a software patch for fixing the security threat based on execution of the GenAI model on results of the execution of the source code for simulating the security threat and storing the software patch in a storage device.

The above embodiments may be implemented in hardware, a computer program executed by a processor, firmware, or a combination of the above. A computer program may be embodied on a computer-readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 11 illustrates an example computer system architecture, which may represent or be integrated into any of the above-described components, etc.

FIG. 11 illustrates an example system 1100 that supports one or more of the example embodiments described and/or depicted herein. The system 1100 comprises a computer system/server 1102, which is operational with numerous other general-purpose or special-purpose computing system environments or configurations. Examples of well-known computing systems, environments, and/or configurations that may be suitable for use with computer system/server 1102 include but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 1102 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in local and remote computer system storage media, including memory storage devices.

As shown in FIG. 11, computer system/server 1102 in the example system 1100 is shown as a general-purpose computing device. The computer system/server 1102 components may include, but are not limited to, one or more processors or processing units (processor 1104), a system memory 1106, and a bus that couples various system components, including the system memory 1106 to the processor 1104.

The bus represents one or more of several types of bus structures, including a memory bus or memory controller, a peripheral bus, an accelerated graphics port, and a processor or local bus using various bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes various computer system-readable media. Such media may be any available media that is accessible by computer system/server 1102, and it includes both volatile and non-volatile media, removable and non-removable media. The system memory 1106, in one embodiment, implements the flow diagrams of the other figures. The system memory 1106 can include computer system readable media in the form of volatile memory, such as random-access memory (RAM) 1110 and/or cache memory 1112. Computer system/server 1102 may include other removable/non-removable, volatile/non-volatile computer system storage media. By way of example only, storage system 1114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM or other optical media can be provided. In such instances, each can be connected to the bus by one or more data media interfaces. As further depicted and described below, the system memory 1106 may include at least one program product with a set (e.g., at least one) of program modules configured to carry out the functions of various embodiments of the application.

Program/utility 1116, having a set (at least one) of program modules 1118, may be stored in the system memory 1106 by way of example, and not limitation, as well as an operating system, one or more application programs, other program modules, and program data. Each of the operating system, one or more application programs, other program modules, and program data or some combination thereof may include an implementation of a networking environment. Program modules 1118 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present application may be a computer program product embodied in one or more computer-readable medium(s) having computer-readable program code embodied thereon.

Computer system/server 1102 may also communicate with one or more external devices 1120 such as a keyboard, a pointing device, a display 1122, etc.; one or more devices that enable a user to interact with computer system/server 1102; and/or any devices (e.g., network card, modem, etc.) that enable computer system/server 1102 to communicate with one or more other computing devices. Such communication can occur via I/O interfaces 1124. Still yet, computer system/server 1102 can communicate with one or more networks, such as a local area network (LAN), a general wide area network (WAN), and/or a public network (e.g., the Internet) via network adapter 1126. As depicted, network adapter 1126 communicates with the other components of the computer system/server 1102 via a bus. It should be understood that although not shown, other hardware and/or software components could be used in conjunction with computer system/server 1102. Examples include, but are not limited to, microcode, device drivers, redundant processing units, external disk drive arrays, RAID systems, tape drives, and data archival storage systems, etc.

Although an exemplary embodiment of at least one of a system, method, and computer-readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and about various events, internal or external to the modules or components. Also, the information sent between various modules can be sent between the modules via at least one of a data network, the Internet, a voice network, an Internet Protocol network, a wireless device, a wired device, and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application but to provide one example of many embodiments. Indeed, methods, systems, and apparatuses disclosed herein may be implemented in localized and distributed forms consistent with computing technology.

It should be noted that some of the system features described in this specification have been presented as modules to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, etc.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations, which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated within modules embodied in any suitable form and organized within any suitable type of data structure. The operational data may be collected as a single data set or may be distributed over different locations, including over different storage devices, and may exist, at least partially, merely as electronic signals on a system or network.

It will be readily understood that the application components, as generally described and illustrated in the figures herein, may be arranged and designed in various configurations. Thus, the detailed description of the embodiments is not intended to limit the scope of the application as claimed but is merely representative of selected embodiments of the application.

One with ordinary skill in the art will readily understand that the above may be practiced with steps in a different order and/or hardware elements in configurations that are different from those disclosed. Therefore, although the application has been described based on these preferred embodiments, certain modifications, variations, and alternative constructions would be apparent to those of skill in the art.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) to it.

What is claimed is:

1. An apparatus comprising:
   a memory storing source code; and
   a processor coupled to the memory, wherein the processor is configured to:
      monitor communications that occur with user devices over a shared computer network,
      detect a security threat from the communications,
      generate a software program to simulate the security threat over the shared computer network based on execution of a generative artificial intelligence (GenAI) model on the source code and a description of the security threat,
      install the source code for simulating the security threat in a digital twin of the shared computer network, and
      execute the source code using the digital twin to simulate the security threat.

2. The apparatus of claim 1, wherein the processor is configured to:
   record data from the communications in a log, and
   detect the security threat based on execution of a machine learning model on the log.

3. The apparatus of claim 2, wherein the processor is configured to:
   generate the description of the security threat based on the execution of the machine learning model on the log.

4. The apparatus of claim 1, wherein the processor is configured to:
   monitor communications that occur between the user devices and a software application hosted on a host platform,
   wherein the processor is configured to detect a vulnerability in the software application hosted by the host platform based on responses to the user devices from the software application.

5. The apparatus of claim 1, wherein the communications comprise one or more of:
   client-server communications, network payloads, or network traffic patterns that occur on the shared computer network.

6. The apparatus of claim 1, wherein the digital twin is on a different computer network.

7. The apparatus of claim 1, wherein the processor is configured to:
   generate a software patch for fixing the security threat based on execution of the GenAI model on results of the execution of the source code for simulating the security threat, and
   store the software patch in the memory.

8. A method comprising:
   monitoring communications that occur with user devices over a shared computer network;
   detecting a security threat from the communications;
   generating a software program to simulate the security threat over the shared computer network based on execution of a generative artificial intelligence (GenAI) model on a description of the security threat and source code stored in a repository;
   installing the source code for simulating the security threat in a digital twin of the shared computer network; and executing the source code using the digital twin to simulate the security threat.

9. The method of claim 8, wherein the method comprises:
recording data from the communications in a log; and
detecting the security threat based on executing a machine learning model on the log.

10. The method of claim 9, wherein the method comprises:
generating the description of for the security threat based on the executing of the machine learning model on the log.

11. The method of claim 8, wherein the monitoring comprises:
monitoring communications that occur between the user devices and a software application hosted on a host platform,
wherein the detecting comprises detecting a vulnerability in the software application hosted by the host platform based on responses to the user devices from the software application.

12. The method of claim 8, wherein the communications comprise one or more of:
client-server communications, network payloads, or network traffic patterns that occur on the shared computer network.

13. The method of claim 8, wherein the digital twin is on a different computer network.

14. The method of claim 8, wherein the method comprises:
generating a software patch for fixing the security threat based on execution of the GenAI model on results of the execution of the source code for simulating the security threat; and
storing the software patch in a storage device.

15. A non-transitory computer-readable medium comprising instructions that, when executed by a processor, cause the processor to perform:
monitoring communications that occur with user devices over a shared computer network;
detecting a security threat from the monitored communications;
generating a software program to simulate the security threat over the shared computer network based on execution of a generative artificial intelligence (GenAI) model on a description of the security threat and source code stored in a repository;
installing the source code for simulating the security threat in a digital twin of the shared computer network; and
executing the source code using the digital twin to simulate the security threat.

16. The non-transitory computer-readable medium of claim 15, wherein the instructions cause the processor to perform:
recording data from the communications in a log; and
detecting the security threat based on executing a machine learning model on the log.

17. The non-transitory computer-readable medium of claim 15, wherein the monitoring comprises:
monitoring communications that occur between the user devices and a software application hosted on a host platform,
wherein the detecting comprises detecting a vulnerability in the software application hosted by the host platform based on responses to the user devices from the software application.

18. The non-transitory computer-readable medium of claim 15, wherein the digital twin is on a different computer network.

* * * * *